(12) United States Patent
Watanabe et al.

(10) Patent No.: US 7,297,921 B2
(45) Date of Patent: Nov. 20, 2007

(54) PHOTODETECTION CIRCUIT AND CONFOCAL MICROSCOPE THAT HAS IT

(75) Inventors: Hideo Watanabe, Tokyo (JP); Akihiro Kitahara, Tokyo (JP)

(73) Assignee: Olympus Corportion, Tokyo (JP)

( * ) Notice: Subject to any disclaimer, the term of this patent is extended or adjusted under 35 U.S.C. 154(b) by 191 days.

(21) Appl. No.: 10/990,747

(22) Filed: Nov. 17, 2004

(65) Prior Publication Data

US 2005/0133692 A1    Jun. 23, 2005

(30) Foreign Application Priority Data

Nov. 21, 2003 (JP) .............................. 2003-391643
Sep. 17, 2004 (JP) .............................. 2004-272353
Sep. 28, 2004 (JP) .............................. 2004-282753

(51) Int. Cl.
*H01J 43/30* (2006.01)
*H03F 3/08* (2006.01)

(52) U.S. Cl. ............................ 250/214 LA; 250/214 A
(58) Field of Classification Search ......... 250/214 LA, 250/214 A See application file for complete search history.

(56) References Cited

U.S. PATENT DOCUMENTS

| 3,611,042 A | * | 10/1971 | Boronkay ................... 361/91.5 |
| 6,104,734 A | * | 8/2000 | Ino et al. ....................... 372/26 |
| 6,115,163 A | * | 9/2000 | Nobuhara .................... 398/210 |
| 6,191,879 B1 | * | 2/2001 | Yanagisawa ................ 398/210 |

FOREIGN PATENT DOCUMENTS

| JP | 6-124192 | 5/1994 |
| JP | 7-212158 | 8/1995 |

* cited by examiner

*Primary Examiner*—Georgia Epps
*Assistant Examiner*—Kevin Wyatt
(74) *Attorney, Agent, or Firm*—Scully, Scott, Murphy & Presser, P.C.

(57) ABSTRACT

A first amplification unit amplifies at a predetermined amplification rate an output signal from a photodetection unit for detecting an optical signal from a specimen and detecting it. An offset unit assigns offset to an output signal from the photodetection unit. A second amplification unit amplifies at an amplification rate smaller than the amplification rate of the first amplification unit an output signal from the photodetection unit assigned the offset by the offset unit. A rectification unit rectifies an output signal from the second amplification unit. An addition unit adds an output signal from the first amplification unit to an output signal from the rectification unit.

8 Claims, 18 Drawing Sheets

US 7,297,921 B2

PHOTODETECTION CIRCUIT AND CONFOCAL MICROSCOPE THAT HAS IT

CROSS REFERENCE TO RELATED APPLICATIONS

This application claims benefit of Japanese Applications No. 2003-391643, filed Nov. 21, 2003; No. 2004-282753, filed Sep. 28, 2004; and No. 2004-272353, filed Sep. 17, 2004, the contents of which are incorporated by this reference.

BACKGROUND OF THE INVENTION

1. Field of the Invention

The present invention relates to a photodetection circuit and a confocal microscope having the circuit, and more specifically to a photodetection circuit for enlarging the photodetection dynamic range and improving the S/N ratio of height data, and a confocal microscope having the circuit.

2. Description of the Related Art

Conventionally, a confocal microscope applies dotted illumination to a specimen, converges transmitted light, reflected light, or fluorescence from the specimen on a confocal diaphragm, and detects by a photodetector the intensity of the light passing through the confocal diaphragm, thereby obtaining the surface information about the specimen. A scanning confocal microscope scans the surface of the specimen using dotted illumination in various methods, thereby obtain the surface information about the specimen in a wide range.

FIG. 1 shows the outline of the configuration of a conventional confocal microscope (scanning confocal laser microscope).

With the confocal microscope shown in FIG. 1, a laser beam output from a laser beam source 101 passes through a beam splitter 102, and enters a two-dimensional scanning mechanism 103. The two-dimensional scanning mechanism 103 has a first optical scanner 103a and a second optical scanner 103b, performs two-dimensional scanning using luminous flux, and leads it to an object lens 107. The luminous flux input to the object lens 107 becomes converging beam and scans the surface of a specimen 108.

The light reflected by the surface of the specimen 108 is introduced from the object lens 107 again to the beam splitter 102 through the two-dimensional scanning mechanism 103, then reflected by the beam splitter 102, and converges on a pinhole 110 by an image forming lens 109. The pinhole 110 cuts off the reflected light from the points other than the beam condensing point of the specimen 108, and a photodetector 111 detects the light only passing through the pinhole 110.

The specimen 108 is held on a specimen table 113. A stage 114 and the photodetector 111 is controlled by a computer 112.

The beam condensing position by the object lens 107 is in a position optically conjugate with the pinhole 110. When the specimen 108 is in the beam condensing position of the object lens 107, the reflected light from the specimen 108 converges on the pinhole 110 and passes through the pinhole 110. When the specimen 108 is displaced from the beam condensing position of the object lens 107, the reflected light from the specimen 108 does not converges on the pinhole 110, and does not pass through the 110.

FIG. 2 shows an I-Z curve indicating the relationship between the relative position (Z) of the object lens 107 to the specimen 108 and the output (I) of the photodetector 111.

As shown in FIG. 2, when the specimen 108 is in the beam condensing position Z0 of the object lens 107, the output of the photodetector 111 indicates a maximum value. As the relative position of the object lens 107 to the specimen 108 leaves from the position, the output of the photodetector 111 indicates a sudden decrease.

With the characteristic, if the two-dimensional scanning mechanism 103 performs two-dimensional scanning on the beam condensing point, and an image is generated by the output of the photodetector 111 in synchronization with the two-dimensional scanning mechanism 103, then an image of only a specific height portion of the specimen 108 is formed, and an image (confocal image) is obtained by optically slicing the specimen 108. Furthermore, the specimen 108 is discretely moved on the specimen 108 in the optical axis direction, the two-dimensional scanning mechanism 103 performs scanning in each position to obtain a confocal image, and the Z position of the stage 114 where the output of the photodetector 111 indicates the maximum value is detected, thereby obtain the height information about the specimen 108. Additionally, by overlaying and displaying the maximum value of the output of the photodetector 111 at each point of the specimen, an image can be obtained with all points of the image displayed in focus (extend image).

Thus, when there is a large difference in brightness with the confocal microscope, that is, when a specimen having a large brightness difference between a bright portion and a dark portion is observed, it is necessary to adjust the detection sensitivity not to reach saturation on the screen. In this case, the adjustment is to be made based on a bright portion, and the data of a dark point includes much noise. Therefore, generally, a bright portion is compressed using a logarithm amplifier ($\gamma$ characteristic) while a dark portion is brightened to expand the photodetection dynamic range, thereby reducing the entire contrast (for example, Japanese Patent Laid-open Publication No. H7-212158). There also the technology of using the LUT (lookup table) to improve the visibility of a dark portion (for example, Japanese Patent Laid-open Publication No. H6-124192).

SUMMARY OF THE INVENTION

The photodetection circuit of each aspect of the present invention can be used for a confocal microscope, and has the following configuration.

The photodetection circuit of the first aspect of the present invention includes: a photodetection unit for amplifying and detecting an optical signal from a specimen; a first amplification unit for amplifying an output signal from the photodetection unit at a predetermined amplification rate; an offset unit for giving an offset to an output signal from the photodetection unit; a second amplification unit for amplifying an output signal from the photodetection unit to which an offset is given; a rectification unit for rectifying the output signal from the second amplification unit; and an addition unit for adding the output signal from the first amplification unit to the output signal from the rectification unit.

The photodetection circuit of the second aspect of the present invention further includes in addition to the configuration of the first aspect a signal removal unit for removing from the output signal output by the addition unit an output signal portion from the rectification unit.

The photodetection circuit of the third aspect of the present invention includes: a photodetection unit for amplifying and detecting an optical signal from a specimen; a first amplification unit for amplifying an output signal from the photodetection unit at a predetermined amplification rate; a second amplification unit for amplifying an output signal from the photodetection unit at an amplification rate smaller than the amplification rate of the first amplification unit, and rectifying and outputting the output signal; an offset unit for giving an offset to the output signal from the second amplification unit; and an addition/subtraction unit for performing addition or subtraction on the output signal from the second amplification unit to which an offset is given by the offset unit and the output signal from the first amplification unit.

The photodetection circuit of the fourth aspect of the present invention includes: a photodetection unit for amplifying and detecting an optical signal from a specimen; a first amplification unit for amplifying an output signal from the photodetection unit at a predetermined amplification rate; one or more second amplification units for amplifying an output signal from the photodetection unit at an amplification rate smaller than the amplification rate of the first amplification unit, and outputting the output signal; an offset unit for giving an offset to the output signal from the second amplification units; a rectification unit for rectifying the output signal from the second amplification unit which is given an offset by the offset unit; an addition/subtraction unit for performing addition or subtraction on the offset and rectified output signal from the second amplification unit and the output signal from the first amplification unit; a switch unit for selecting one of the output signal from the first amplification unit and the output signal obtained by the addition/subtraction unit performing addition or subtraction, and outputting the result; and an amplification rate change unit for changing the amplification rate of the photodetection unit depending on the switch of the output signal by the switch unit.

The photodetection circuit of the fourth aspect of the present invention includes: a photodetection unit for amplifying and detecting an optical signal from a specimen; an amplification unit for amplifying an output signal from the photodetection unit at a predetermined amplification rate; and a amplification rate change unit for changing the amplification rate of the photodetection unit depending on the switch of the object lens in the microscope.

The confocal microscopes according to the first through fifth aspects of the present invention are provided with the photodetection circuit according to the above-mentioned first through fifth aspects.

BRIEF DESCRIPTION OF THE DRAWINGS

The present invention will be more apparent from the following detailed description when the accompanying drawings are referenced.

DESCRIPTION OF THE PREFERRED EMBODIMENTS

The embodiments of the present invention are described below by referring to the attached drawings.

Figure 1:
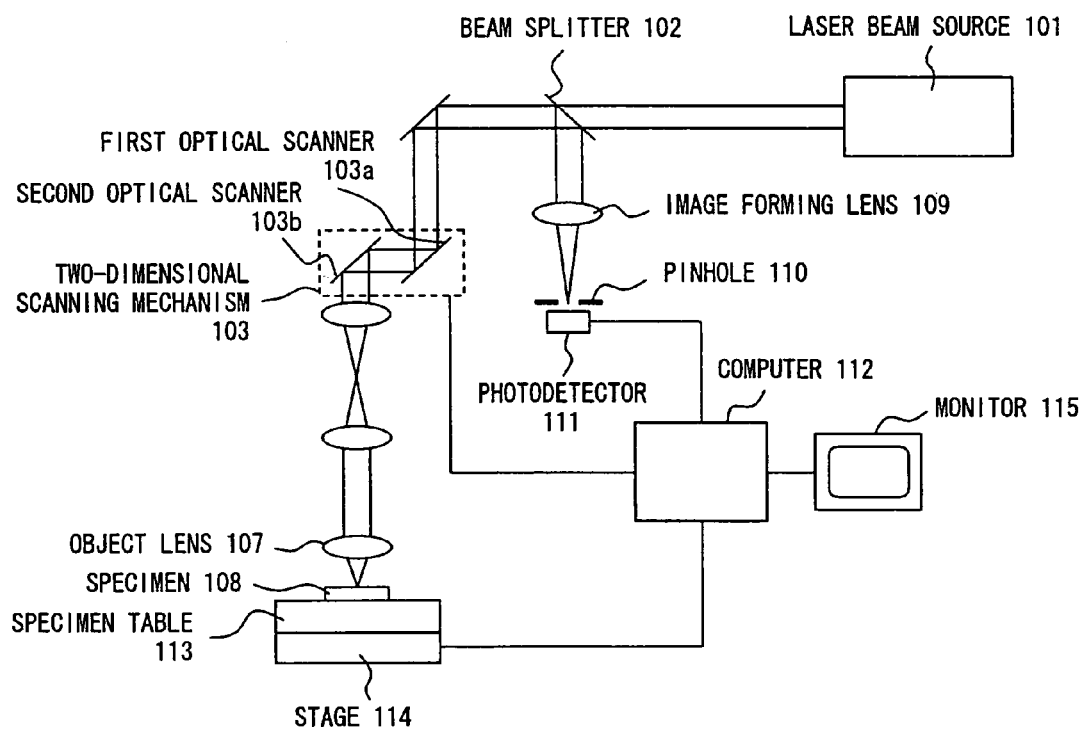
FIG. 1 shows the outline of the configuration of the conventional confocal microscope.
Figure 2:
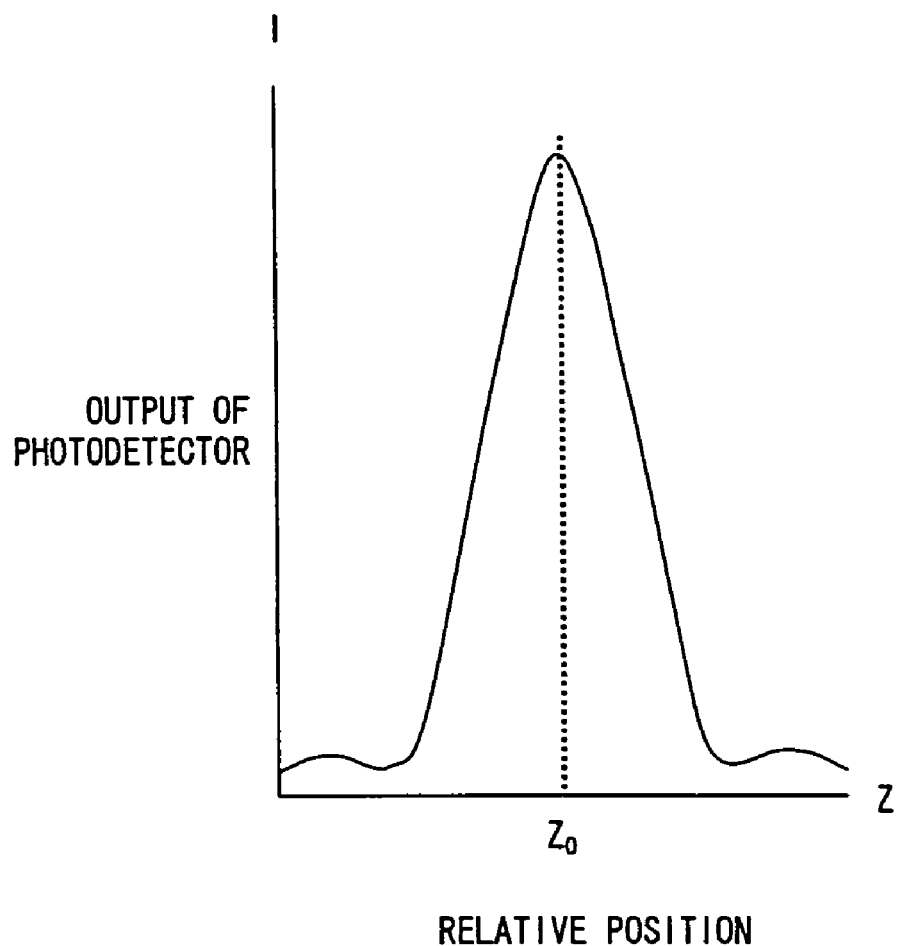
FIG. 2 shows an I-Z curve indicating the relationship between the relative position (Z) of the object lens 107 to the specimen 108 and the output (I) of the photodetector 111.
Figure 3:
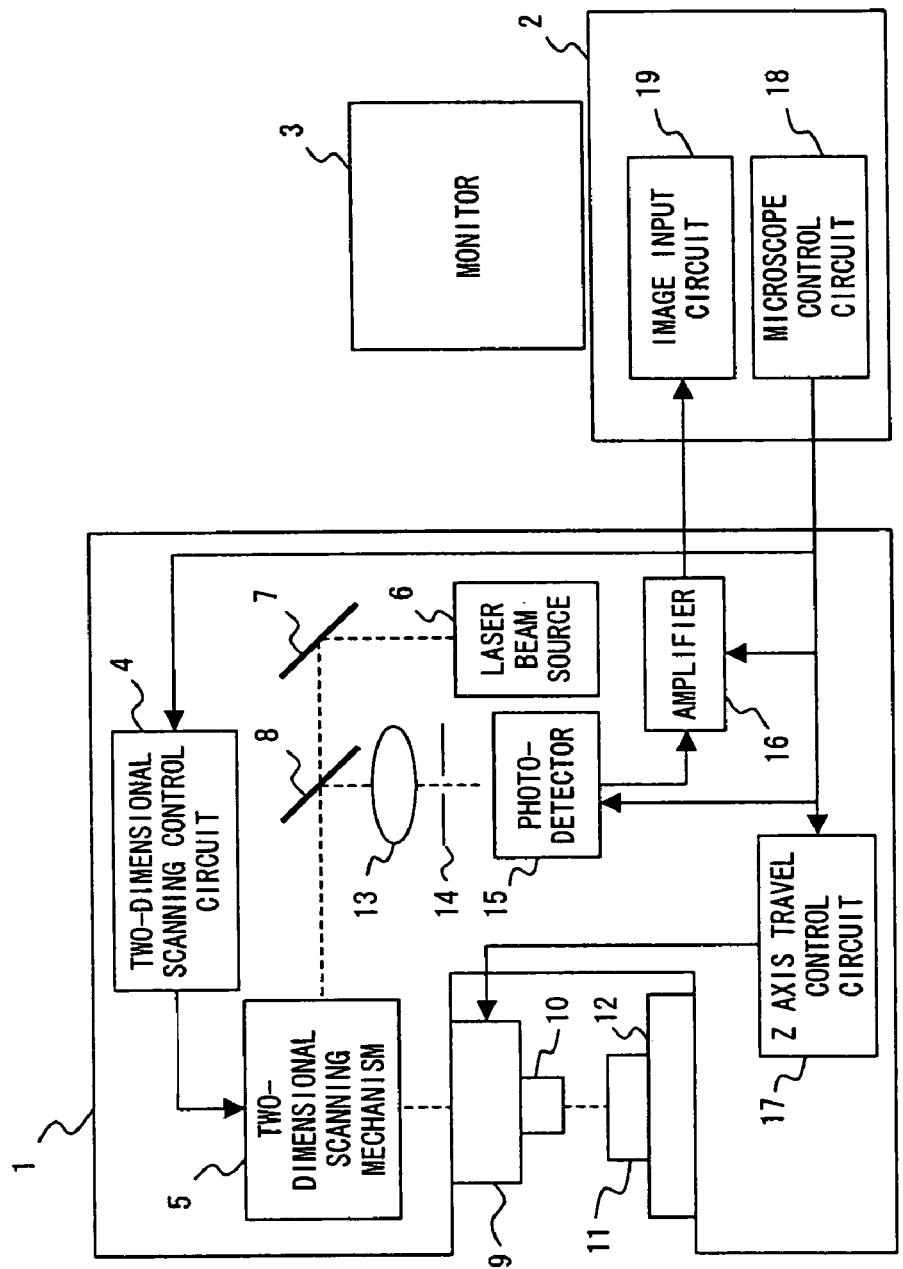
FIG. 3 is a block diagram showing the configuration of the confocal microscope to which the present invention is applied.
Figure 4:
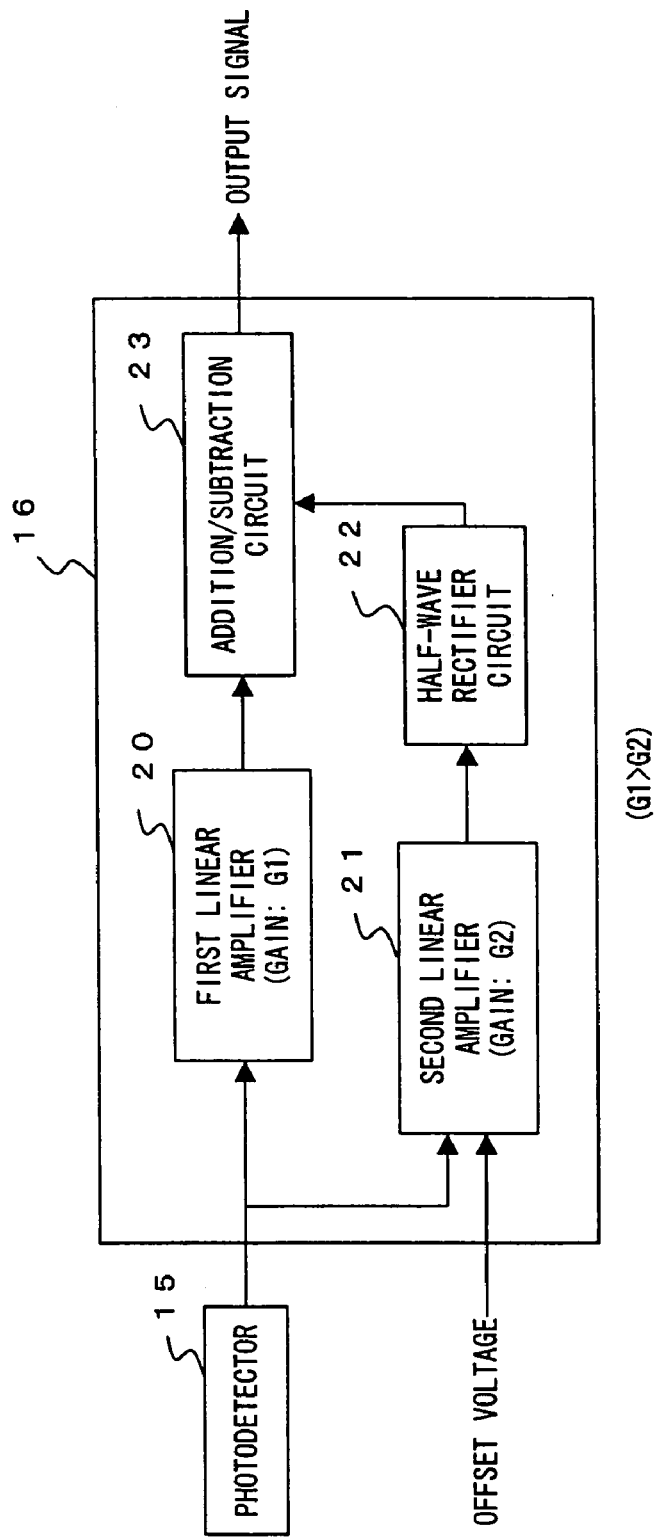
FIG. 4 shows the configuration of the photodetection circuit to which the present invention is applied.
Figure 5:
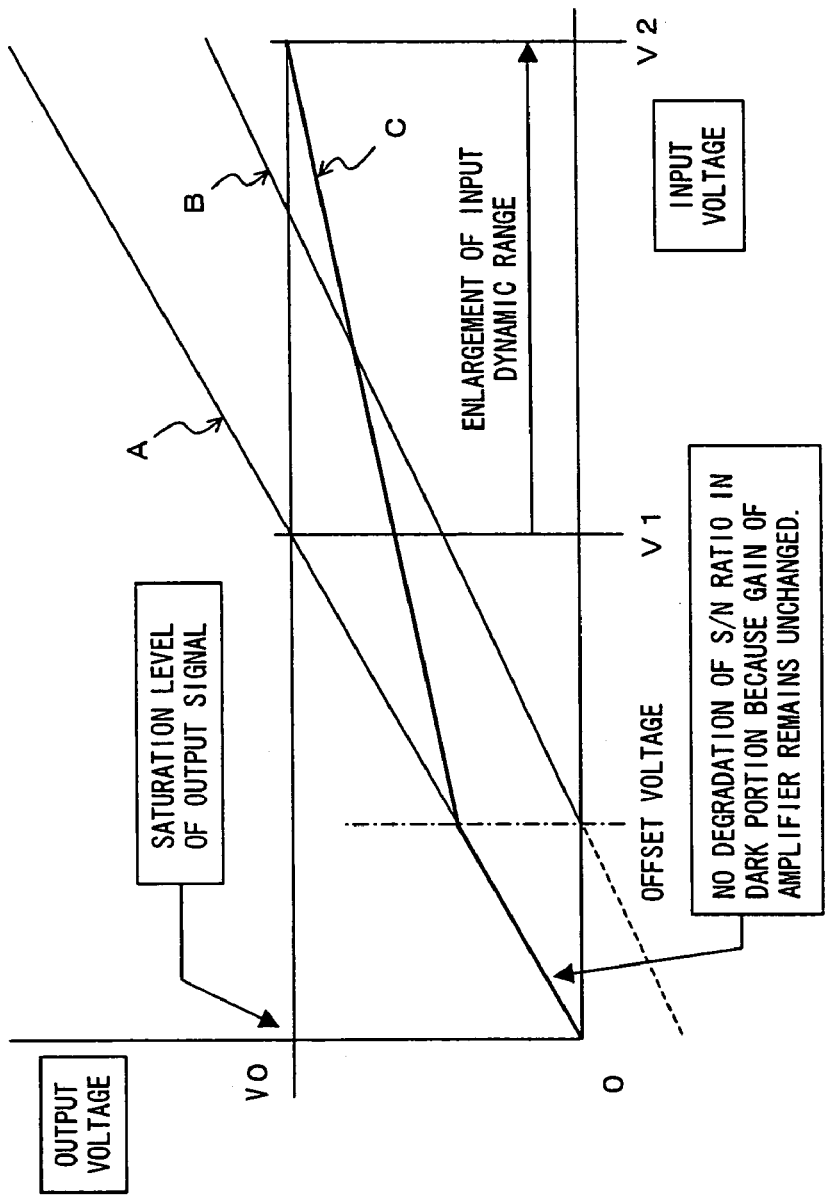
FIG. 5 is an explanatory view of the process of expanding the input dynamic range without reducing the S/N ratio of a dark portion on the screen.

The first embodiment of the present invention is explained by referring to FIGS. 3 through 5.

FIG. 3 is a block diagram showing the configuration of the confocal microscope (scanning confocal laser microscope) to which the present invention is applied.

First, a body of a microscope 1 is configured as follows.

A laser beam source 6 generates a laser beam as a spot beam for scanning the surface of a specimen 11. A mirror 7 is a reflector for leading the laser beam from the laser beam source 6 to a two-dimensional scanning mechanism 5. The two-dimensional scanning mechanism 5 is a mechanism for using a laser beam from the laser beam source 6 obtained through the mirror 7 in the two-dimensional scanning. The two-dimensional scanning mechanism 5 performs XY scanning using a spot beam under the control of a two-dimensional scanning control circuit 4. The two-dimensional scanning mechanism 5 comprises, for example, a resonant scanner for scanning in the X axis direction and a galvano-scanner for scanning in the Y axis direction. The two-dimensional scanning mechanism 5 can perform scanning in the X and Y directions along the optical path of a spot beam for an object lens 10 by directing the resonant scanner and the galvano-scanner respectively in the X axis direction and Y axis direction.

A revolver 9 holds a plurality of object lenses 10 having different power. The revolver 9 can be moved in the optical axis direction (vertical direction) using a Z axis travel control circuit 17, and can set the object lens 10 having a desired power in the plurality of object lenses 10 in the optical observation path of a microscope by a switching operation. Through the set object lens 10, the spot beam is emitted from the two-dimensional scanning mechanism 5 and used in the two-dimensional scanning on the specimen 11 on a stage 12. The stage 12 is a stage to hold the specimen 12.

On the other hand, the reflected light from the specimen 11 is returned to the two-dimensional scanning mechanism 5 through the object lens 10, and then returned from the two-dimensional scanning mechanism 5 to a half mirror 8. The half mirror 8 is a semitransparent mirror provided on the optical output path of the laser beam source 6 for the two-dimensional scanning mechanism 5, and leads reflected light from the specimen 11 obtained through the two-dimensional scanning mechanism 5 to the detection system. A lens 13 collects reflected light obtained through the half mirror 8 from the two-dimensional scanning mechanism 5. A pinhole plate 14 has pinholes of a predetermined diameter respectively, and one of the pinhole is arranged in the focal position of the lens 13 on the front side of the phtoreception surface of a photodetector 15. The photodetector 15 is a photodetection element for converting the light obtained through the pinhole to an electric signal corresponding to the quantity of the light. The electric signal obtained from the photodetector 15 is amplified to a predetermined level by an amplifier 16.

A microscope control circuit 18 and an image input circuit 19 are in a computer 2. The microscope control circuit 18 is connected to the two-dimensional scanning control circuit 4 in the body of a microscope 1, and the Z axis travel control circuit 17, and controls the computer 2 to execute an instruction from an operator by input device not shown in the attached drawings, for example, to start and stop the scanning on the two-dimensional scanning control circuit 4 and appropriately perform the process of driving the revolver 9 by the body of a microscope 1. The image input circuit 19 receives a signal photoelectrically converted by the photodetector 15 and amplified by the amplifier 16, and a timing signal from the two-dimensional scanning control circuit 4, and the computer 2 forms an image from the signals and displays them on a monitor 3, thereby obtaining surface information about the specimen 11.

FIG. 4 shows the configuration of the photodetection circuit to which the present invention is applied.

The photodetection circuit to which the present invention is applied is configured by the photodetector 15 and the amplifier 16.

The photodetector 15 detects the light from the specimen 11 and photoelectrically converts it. The output signal from the photodetector 15 is input to a first linear amplifier 20 and a second linear amplifier 21, amplified at a predetermined amplification rate (gain G1) by the first linear amplifier 20, and amplified at an amplification rate (gain G2) (G1>G2) by the second linear amplifier 21. An offset voltage is applied to the second linear amplifier 21.

The signal which has passed through the second linear amplifier 21 is processed by a half-wave rectifier circuit 22 such that only one side signal of the positive and negative signals can be passed. Finally, an addition/subtraction circuit 23 calculates the output of the first linear amplifier 20 and the output of the half-wave rectifier circuit 22, and the resultant is obtained as an output signal of the amplifier 16.

FIG. 5 is an explanatory view of the process of expanding the input dynamic range without reducing the S/N ratio of a dark portion on the screen.

The amplifier explained by referring to FIGS. 3 through 5 expands the input dynamic range without reducing the S/N ratio of a dark portion on the screen. The process is explained by referring to FIG. 5. The horizontal axis shown in FIG. 5 indicates an input voltage, and the vertical axis indicates an output voltage. The specimen 11 can be various types, and is explained below as having large difference in contrast (large brightness difference between a bright portion and a dark portion) on the screen. "A" shown in FIG. 5 indicates an output signal of the first linear amplifier 20. Similarly, "B" indicates an output signal of the second linear amplifier 21, and "C" indicates an output signal of the addition/subtraction circuit 23. These hold true in the subsequent descriptions.

Generally, when a specimen indicating a large difference in contrast is observed, there can be a case in which an input voltage cannot be smaller than the range from 0 to V1, and can reach the range from V1 to V2 at the bright portion on the screen. If the input dynamic range of the image input circuit 19 is equal to V0, the bright portion exceeds the limit of the display and indicates white saturation.

To avoid this, the intensity of the illumination to the specimen 11 is reduced. For example, when the output of the laser beam source 6 is suppressed, the bright portion becomes V0 or lower. However, the level of the dark portion is also lowered, and it becomes difficult in discriminating the data of the dark portion. Additionally, the effect of the circuit noise lowers the S/N ratio, thereby reducing the quality of data. To prevent this, the path of the second linear amplifier 21 is provided.

The first linear amplifier 20 multiplies the input signals of 0 to V1 and in excess of V1 by G1 as is and output them (refer to A shown in FIG. 5). On the other hand, the reference voltage for offset is input to the second linear amplifier 21. When the input signal from the photodetector 15 exceeds the offset voltage, the output can be positive or negative on this potential point. That is, in the range of input voltage<offset voltage, the input signal indicates negative output multiplied by G2. In the range of input voltage>offset voltage, the input signal indicates positive output multiplied by G2 (refer to B in FIG. 5).

Since the output of the second linear amplifier 21 is input to the half-wave rectifier circuit 22, 0 is output in the negative range, that is, in the range of input voltage<offset voltage, and the output as a result of multiplying the input signal by G2 is obtained in the positive range, that is, in the range of input voltage>offset voltage.

Therefore, for the addition/subtraction circuit 23 (subtraction in this case), a signal from the first linear amplifier 20 output as a result of multiplying the input voltage by G1, and a signal of 0 in the range of 0 to offset voltage of an input voltage, and a signal multiplied by G2 is applied.

As a result, the output voltage from the addition/subtraction circuit 23 is the voltage of the signal multiplied by the first linear amplifier 20 in the range of the input voltage from 0 to offset voltage, and the voltage of the signal multiplied by (G1–G2) as a total gain in the range of offset voltage or higher (refer to "C" shown in FIG. 5).

That is, as shown in FIG. 5, the first linear amplifier 20 can only process the input voltage of V1, but the gain can be reduced in the area of offset voltage or higher by the path of the second linear amplifier 21, thereby hardly attaining the saturation level in the input voltage V1. As a result, the input voltage up to the level of V2 can be processed, and the range of V1 to V2 of the dynamic range can be expanded.

Normally, the conventional logarithm amplifier has the effect of expanding a dynamic range. However, the conventional logarithm amplifier increases the gain of a dark portion and reduces the gain of a bright portion in a circuit. Therefore, the dark portion becomes bright but high in amplification rate of noise and the S/N ratio becomes degraded. However, with the configuration according to the present invention, the gain of the bright portion can be lowered without changing the gain of the dark portion. Therefore, the present invention has the effect of expanding the dynamic range and simultaneously maintaining the S/N ratio.

Described below is the second embodiment of the present invention.

The confocal microscope (scanning confocal laser microscope) to which the second embodiment of the present invention is applied has the same configuration as the first embodiment, but the sensitivity-variable optical sensor used for the photodetector 15 is different.

The feature of the confocal microscope is the function of obtaining the height data of the specimen 11.

The beam condensing position by the object lens 10 is conjugate with the pinhole on the pinhole plate 14. When the specimen 11 is in the beam condensing position by the object lens 10, the reflected light from the specimen 11 converges on the pinhole plate 14, and passes through the pinhole plate 14. When the specimen 11 is displaced from the beam condensing position, the reflected light from the specimen 11 does not converge on the pinhole plate 14, and does not pass through the pinhole plate 14. That is, when the specimen 11 is in the beam condensing position of the object lens 10, the output of the photodetector 15 indicates the maximum value, and as the relative position between the object lens 10 and the specimen 11 deviates from the position, the output of the photodetector 15 suddenly drops.

By the above-mentioned characteristic, only the specific height of the specimen 11 is displayed as an image, and an image can be obtained as an optically sliced image (confocal image) of the specimen 11 when the two-dimensional scanning mechanism 5 two-dimensional scanning is performed on the beam condensing point and the output of the photodetector 15 is displayed as an image in synchronization with the two-dimensional scanning mechanism 5. Furthermore, the height information about the specimen 11 is obtained by discretely moving the revolver 9 in the optical axis direction through the Z axis travel control circuit 17, performing the scanning by the two-dimensional scanning mechanism 5 using a laser beam while changing the relative position between the object lens 10 and the specimen 11, thereby obtaining a confocal image, and detecting the position of the revolver 9 in which the output of the photodetector 15 indicates the maximum value at each point of the specimen.

At this time, in the process of extracting the brightness information indicating the maximum value obtained while moving the revolver 9 at each point of the specimen 11, the operation of constantly comparing the brightness information is performed. One of the factors of the quality of the height information is the S/N ratio of a detection signal. Especially, a dark portion is subject to the effect of noise, etc., and it is desired that the brightest possible information is to be compared. Assuming that the amplifier 16 and the first embodiment have similar configurations, data can be obtained without degrading the S/N ratio of the dark portion by the expansion of the dynamic range of the detection system. However, according to the second embodiment, the photomultiplier tube (hereinafter referred to as a PMT) having the amplification facility not only prevents the degradation of the S/N ratio of a dark portion, but also improves the S/N ratio. If the function of electronically amplifying a signal obtained by converting an optical signal to an electric signal is provided, the PMT can be replaced with an APD (avalanche photo diode), etc.

Figure 6:
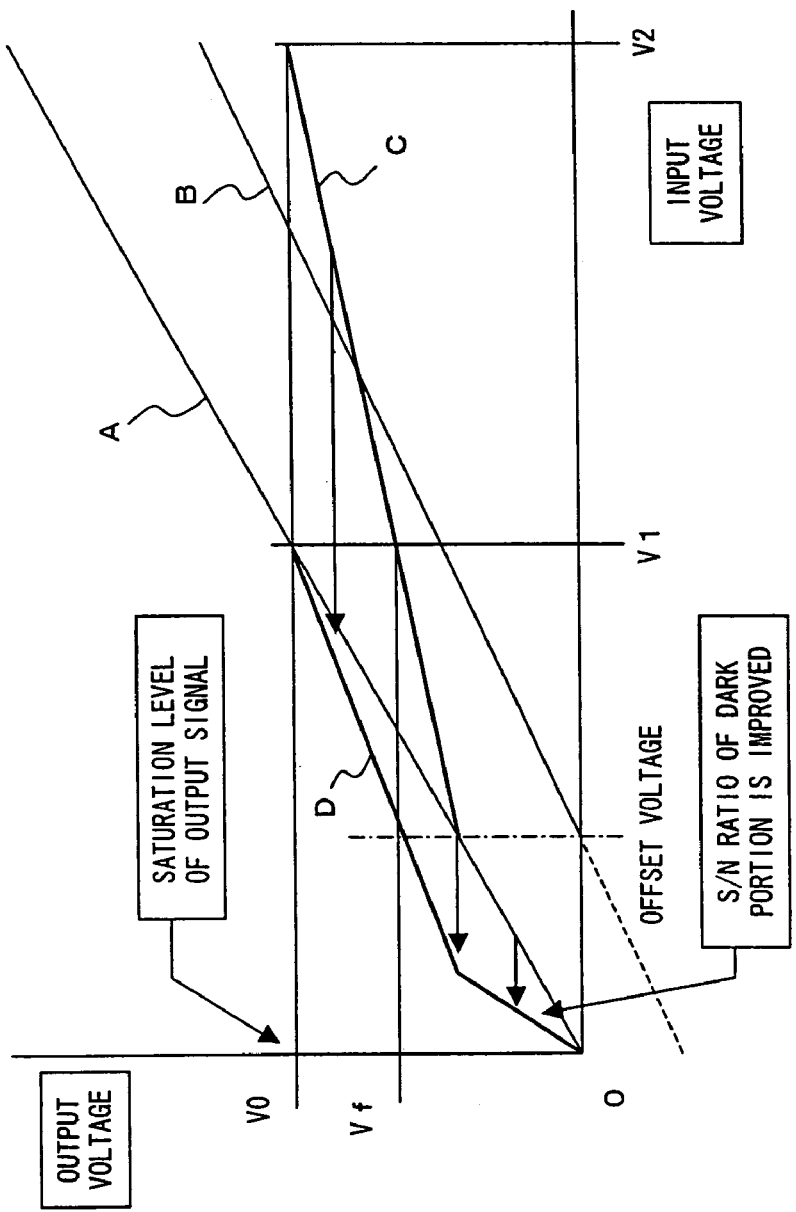
FIG. 6 is an explanatory view of the process of improving the S/N ratio of a dark portion on the screen.

FIG. 6 is an explanatory view of a process of improving the S/N ratio of a dark portion.

First, assume that the detection signal of the specimen 11 is in the range from 0 to V1. The operation of the amplifier 16 is the same as that according to the first embodiment. That is, the input voltage can be obtained up to the level of V2.

At this time, the detection signal from the specimen 11 is in the range from 0 to V1. Therefore, as compared with the case in which the height data of the specimen 11 is obtained only by the first linear amplifier 20, the dynamic range of the output signal is narrowed down to 0 through Vf. However, since the PMT is used for the photodetector 15 in the second embodiment of the present invention, the voltage applied to the PMT can be adjusted (enhanced), thereby possibly amplifying the signal at a high S/N ratio which cannot be realized by the amplification of an electric circuit.

That is, since the input signal to the amplifier 16 can be first amplified by the multiplying system of the sensor for the amount corresponding to V0-Vf and then input, the output signal of the addition/subtraction circuit 23 is changed from C to D as shown in FIG. 6 when it is considered that the range of the output voltage of 0 to V0 is obtained by the range of the same detection signal 0 to V1 from the specimen 11. As compared with the case in which the height data of the specimen 11 is obtained only by the first linear amplifier 20, the signal level of the dark portion is enhanced without fail, and the signal is obtained as an advantageous signal in S/N ratio. As a result, the data precision of the dark portion of the specimen 11 can be considerably improved in the process of storing the position of the revolver 9 for the maximum brightness by comparing the brightness signal.

If an output dynamic range is appropriately adjusted by adjusting the gain of an electric circuit, the S/N ratio is degraded as compared with the case using only the first linear amplifier 20 (the transmission characteristic also indicates an increase for the output voltage axis, and the final transmission characteristic (folded line position) is different from that shown in FIG. 6). However, since the signal intensity is raised in advance by the sensor and the gain of the bright portion to suppress the output saturation by the folded line characteristic which lowers the gain of the bright portion, there arises a large difference in S/N ratio of the final detection signal (height data) although the total gain of the saturation level is maintained.

When a brightness signal is obtained after passing through the amplifier 16 to which the present invention is applied, the relative difference of the signal is not linear. However, since the system of obtaining height data is to store the position in which the maximum brightness value is given for each point of the specimen 11 while changing the relative position in the optical axis direction between the object lens 10 and the specimen 11, the absolute value of the brightness is not taken into account, but the relative comparison is made in the brightness value group in the optical axis direction at each point of the specimen 11. Therefore, since the linearity of the brightness is not required (it is impossible to invert the bright and dark portions), the height data can be correctly obtained. On the other hand, the brightness image is obtained with the folded line characteristic as shown in FIG. 6, but it is possible to return to a linear brightness display by giving the inverse characteristic by, for example, a LUT (look-up table).

As described above, the S/N ratio can be improved in the process of obtaining the height data because the processing is performed on an analog signal before it is treated in the digital processing by the image input circuit 19. The signal quality is not changed although the brightness value is amended after a signal is obtained through a linear amplifier and is once A/D converted. The data having a poor S/N ratio in the dark portion and having been sampled has poor signal quality. Therefore, the data remains unreliable although it is treated in digital processing, for example, the brightness is amended using a LUT (look-up table). That is, as described above, the S/N ratio is improved by the combination of a sensitivity-variable sensor and the folded line characteristic indicating the drop of a gain in the bright portion.

Another example of the addition/subtraction circuit 23 does not perform subtraction, but inversely amplifies the path of the second linear amplifier 21, and performs addition after negative half-wave rectification. That is, a combination is designed such that the gain in the bright portion can be finally lowered with the scale, etc. of the actual circuit configuration taken into account.

A system of a different gain (linear amplifier, offset voltage, half-wave rectifier) can also be added in parallel. Thus, a plurality of stages can set a plurality of folded line points, thereby realizing an approximation in the transmission characteristic of logarithm amplifier.

The gains of the offset voltage and the linear amplifier are optionally set (varied), and arbitrary transmission characteristics can be realized depending on folded lines.

Switching can be performed between the linear characteristic and the folded line characteristic. That is, by providing the addition/subtraction circuit 23 with the function of enabling/disabling an operation, only the first linear amplifier 20 can be used as in the conventional system.

The switching can be performed by the microscope control circuit 18 at an instruction from an operator through, for example, an input device not shown in the attached drawings. The gain of each of the first linear amplifiers 20 and 21, and the photodetector 15 can also be changed by the microscope control circuit 18 at an instruction of an operator through the input device.

Next, the effect of the photodetection circuit (amplifier) according to the present invention is described below by referring to FIGS. 7 through 9.

Figure 7:
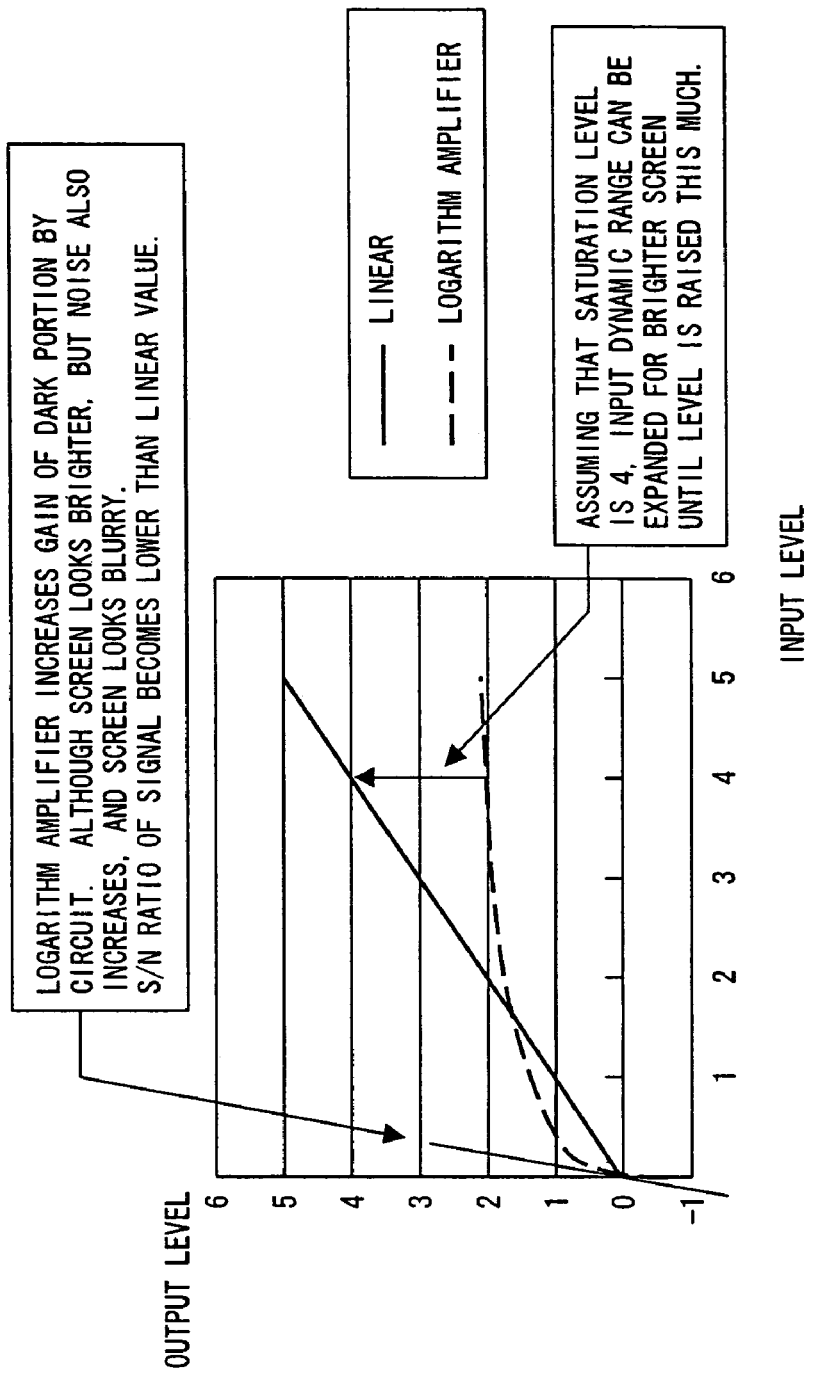
FIG. 7 shows the relationship between the input level and the output level when only a linear amplifier is used and when a logarithm amplifier is used.

FIG. 7 shows the relationship between the input level and the output level when only a linear amplifier is used and when a logarithm amplifier is used.

In this example, the case in which a linear amplifier (normal amplifier) is used is compared with the case in which a logarithm amplifier is used. When a logarithm amplifier is used, for example, assuming that the output saturation level is 4, the input dynamic range can be expanded until the output level is enhanced by 2. Therefore, the gain of the dark portion is increased by the circuit, and the screen looks brighter, but since noise also increases, and the screen looks blurry.

When a linear amplifier is used, the S/N ratio of a signal is output as follows.

Figure 8:
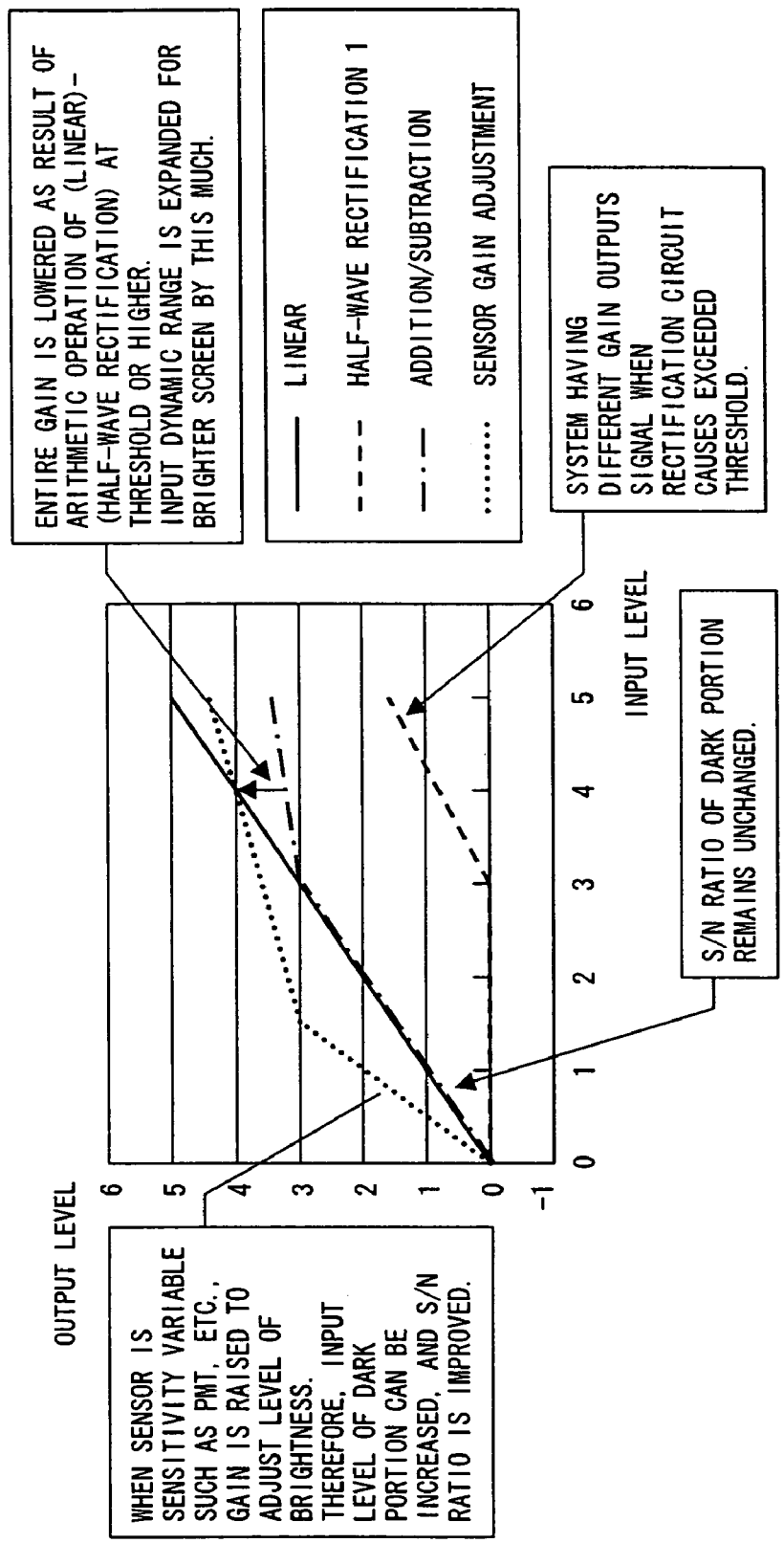
FIG. 8 shows the relationship between the input level and the output level according to the first and second embodiments.

FIG. 8 shows the relationship between the input level and the output level in the first and second embodiments of the present invention.

As described above in the first embodiment, the output of the addition/subtraction circuit can be calculated by (linear)−(half-wave rectification) for the area having the value equal to or larger than the threshold in a system having a different gain because a signal is output by the half-wave rectifier circuit when a threshold (for example, the input level of 3) is exceeded. Therefore, the entire gain is lowered without changing the S/N ratio in the dark portion. By the decrement of the gain, the input dynamic range can be expanded for a bright level.

When a sensor is a sensitivity-variable sensor such as a PMT, etc., the gain of the sensor is raised to adjust the level of the bright portion as described above in the second embodiment. Therefore, the input level of the dark portion can be increased, thereby improving the S/N ratio.

Figure 9:
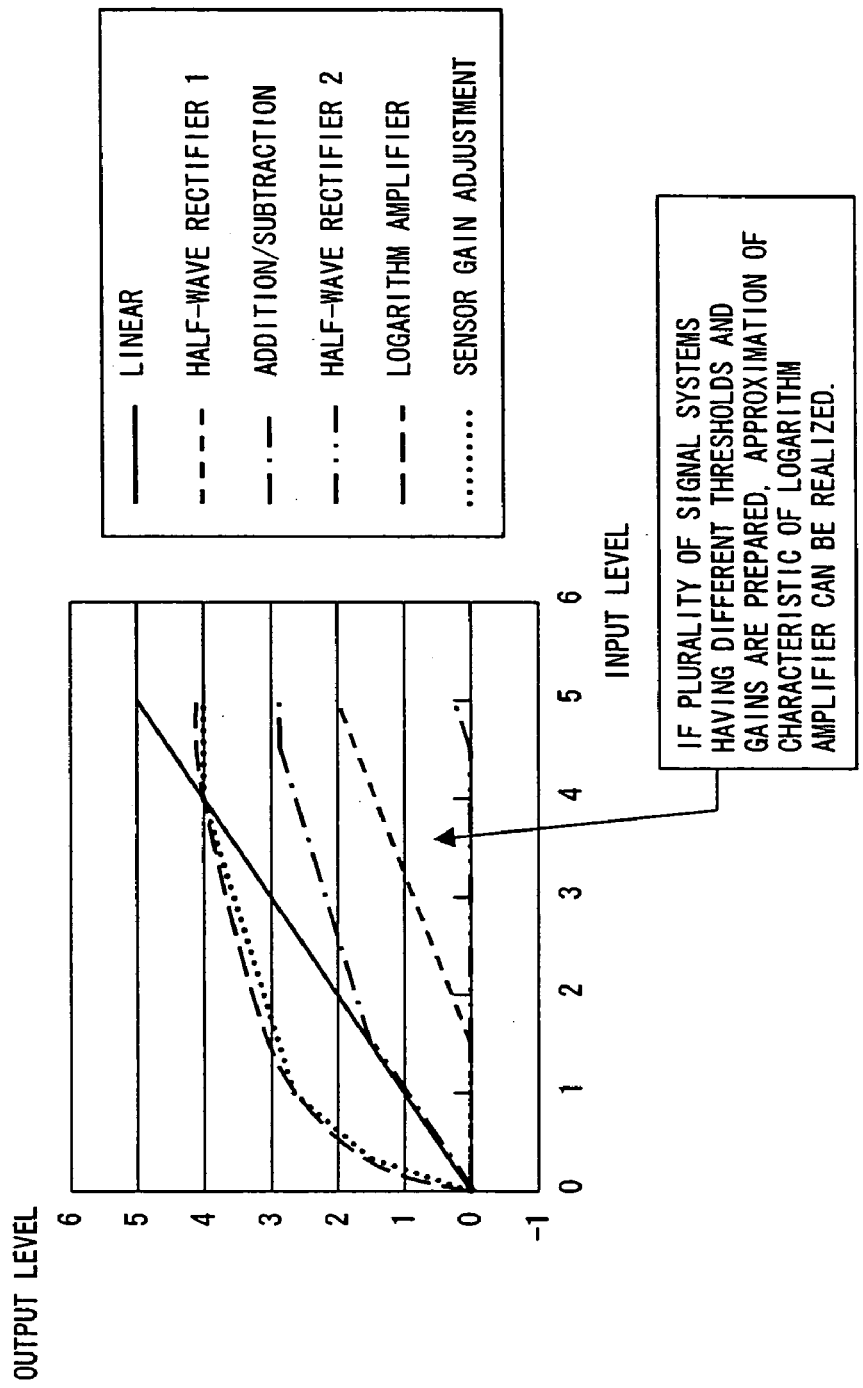
FIG. 9 shows the relationship between the input level and the output level when the systems of different gains are added in parallel.

FIG. 9 shows the relationship between the input level and the output level when systems of different gains are added in parallel.

By adding signal systems of different thresholds and gains (linear amplifier, offset voltage, half-wave rectifier) in parallel to generate a plurality of stages, a plurality of folded lines can be set, thereby realizing an approximation of transmission characteristic of a logarithm amplifier.

Described below is the third embodiment of the present invention.

The confocal microscope to which the third embodiment of the present invention is applied has the same configuration as that according to the second embodiment. Therefore, only the portions different from those according to the second embodiment are described below.

Figure 10:
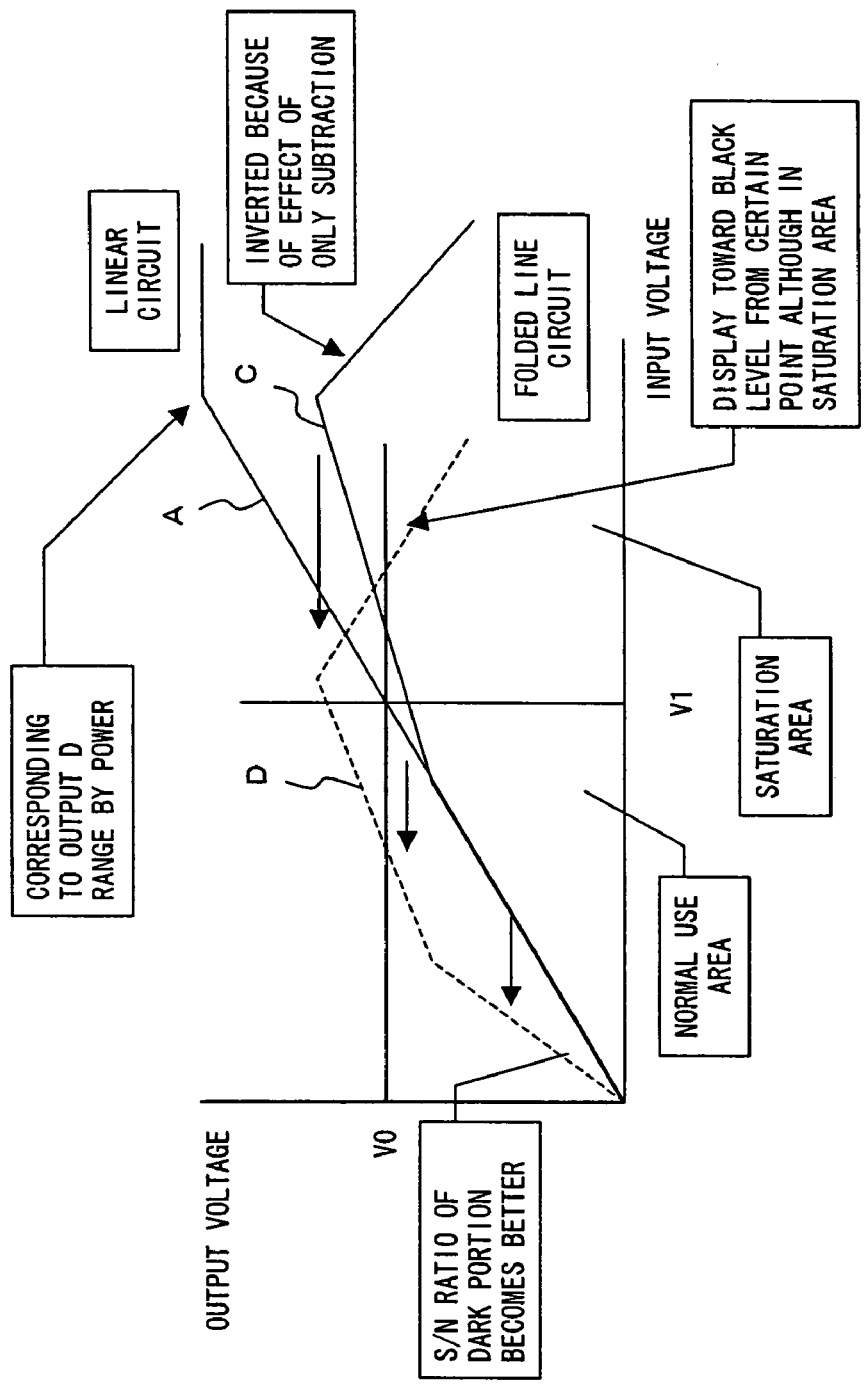
FIG. 10 is an explanatory view showing ill effects by the saturation of the output signal of the first linear amplifier 20.

FIG. 10 is an explanatory view of the ill effects of the saturation of the output signal of the first linear amplifier 20.

There is an upper limit of the output signal of the first linear amplifier 20. When there occurs saturation by the upper limit, as indicated by "A" shown in FIG. 10, the voltage value of an output signal remains unchanged although the voltage value of an input signal becomes large. However, in this state, since the addition/subtraction circuit 23 subtracts an output signal by the second linear amplifier 21 from the output signal of the first linear amplifier 20, the voltage value of the output signal of the addition/subtraction circuit 23 becomes smaller as the voltage value of the input signal becomes larger after the output signal of the first linear amplifier 20 is saturated by the upper limit as indicated by C shown in FIG. 10. Thus, from the point where the upper limit is reached, an image is displayed with a decreasing brightness as the brightness of the specimen 11 becomes higher. This holds good when the gain of the photodetector 15 is changed such that it can be larger. The third embodiment has been designed to suppress the ill effects for the above-mentioned reason.

Figure 11:
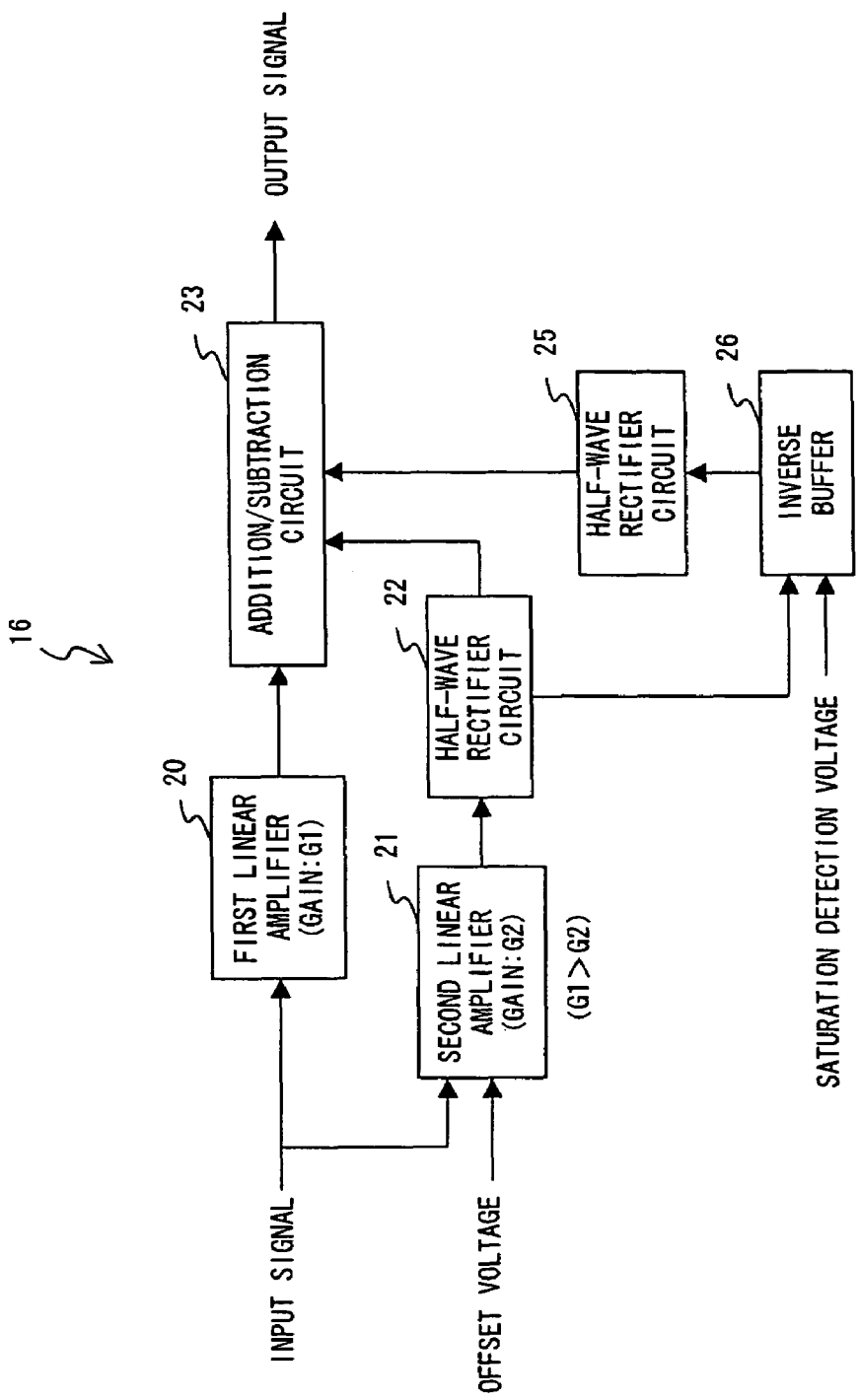
FIG. 11 shows the configuration of the circuit of the amplifier configuring the photodetection circuit according to the third embodiment.

FIG. 11 shows the configuration of the circuit of the amplifier configuring the photodetection circuit according to the third embodiment of present invention. In FIG. 11, the components also used in the second embodiment are assigned the same reference symbols.

An output signal output by the half-wave rectifier circuit 22 is input to an inverse buffer 26 in addition to the addition/subtraction circuit 23. A saturation detection voltage is also input to the inverse buffer 26. The inverse buffer 26 outputs a difference (=saturation detection voltage−output signal) obtained by subtracting the output signal output by the half wave rectifier circuit 22 from the saturation detection voltage to a half-wave rectifier circuit 25. The half-wave rectifier circuit 25 outputs the negative area portion in the output signal (difference) from the inverse buffer 26 to the addition/subtraction circuit 23. The addition/subtraction circuit 23 subtracts the output signal from the half-wave rectifier circuit 22 from the output signal from the first linear amplifier 20, the output signal from the half-wave rectifier circuit 25 is subtracted from the above-mentioned subtraction result. The saturation detection voltage can be arbitrarily set by the microscope control circuit 18.

As described above, the second linear amplifier 21 outputs a positive output signal when an input signal exceeds an offset voltage, and the half-wave rectifier circuit 22 outputs an output signal for the positive portion. Thus, the difference output by the inverse buffer 26 become negative after the output signal from the second linear amplifier 21 reaches the saturation detection voltage. The negative difference is input to the addition/subtraction circuit 23 through the half-wave rectifier circuit 25, and it is further subtracted from the result of subtracting the output signal from the half-wave rectifier circuit 22 from the output signal from the first linear amplifier 20. Therefore, the increment after the output signal of the second linear amplifier 21 reaches the saturation detection voltage is offset by the output signal from the half-wave rectifier circuit 25. As a result of the offset of the increment, after the output signal from the second linear amplifier 21 reaches the saturation detection voltage, the reduction of the output signal of the addition/subtraction circuit 23 can be avoided without fail.

Figure 12:
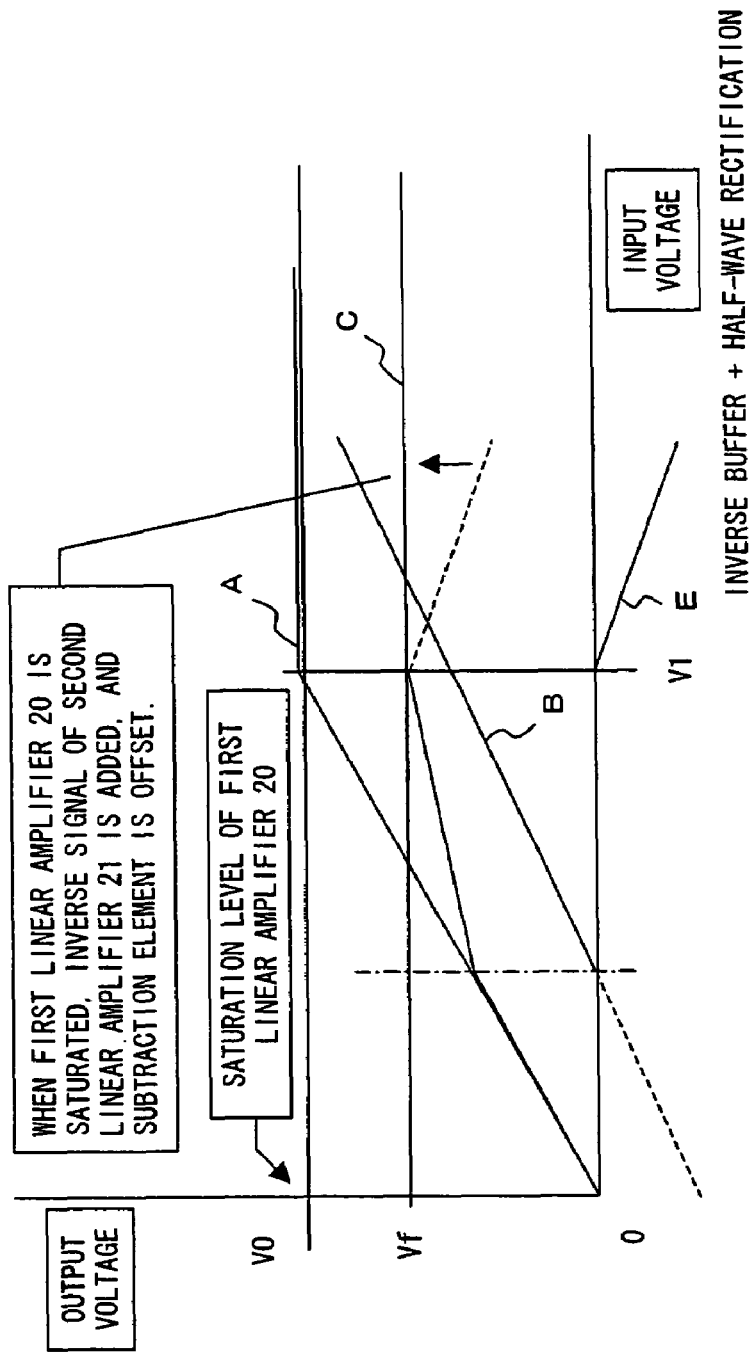
FIG. 12 is an explanatory view of the output signal output in the photodetection circuit according to the third embodiment.

FIG. 12 is an explanatory view of an output signal output by the photodetection circuit according to the third embodiment of the present invention. FIG. 12 shows the case in which when the voltage of an input signal reaches V1, the voltage of the output signal by the first linear amplifier 20 becomes V0 and saturated.

In this case, as a saturation detection voltage, the voltage of the output signal output from the second linear amplifier 21 through the half-wave rectifier circuit 22 is set when the voltage of an input signal reaches V1. By setting the voltage as a saturation detection voltage, the increment of the output signal from the second linear amplifier 21 when and after the voltage of the input signal reaches V1 is output as a negative signal from the half-wave rectifier circuit 25 as indicated by "E" shown in FIG. 12. Therefore, the increment is offset and removed, and the reduction of the voltage level of the output signal after the voltage of an input signal reaches V1 can be avoided. Thus, the reduction of the visibility of an image generated by the reduction of the voltage level can also be avoided without fail.

The first through third embodiments are described above. However, the photodetection circuit to which the present invention is applied and the confocal microscope having the photodetection circuit are not limited to the above-mentioned embodiments so far as the function can be performed, and various configurations and shapes can be applied within the gist of the present invention. The saturation detection voltage can be set with those other than the saturation level of the output signal of the first linear amplifier 20 taken into account. For example, if the configuration of the inverse buffer 26 and the half-wave rectifier circuit 25 is provided at the output side of the first linear amplifier 20, and the output of the half-wave rectifier circuit is input to the addition/subtraction circuit 23, then the raise of the output can be suppressed by the level before the saturation level of the first linear amplifier 20 is reached. In this case, the output signal voltage from the half-wave rectifier circuit 22 with the input signal can be defined as the saturation detection voltage of the inverse buffer.

Described below is the fourth embodiment of the present invention.

Using the folded line characteristic, as shown in FIG. 5, as compared with the linear characteristic, the increment of the output signal for the increment becomes smaller in the portion in which an input signal is large, and the bright portion is compressed. Therefore, when the specimen 11 is observed with an eye kept on the bright portion, it is desired to use the linear characteristic. Thus, the fourth embodiment utilizes the switching between the use of the linear characteristic with the output signal from the first linear amplifier 20 output to the addition/subtraction circuit 23 and the use of the folded line characteristic of subtracting the output signal from the second linear amplifier 21 to the output signal from the first linear amplifier 20.

The confocal microscope to which the fourth embodiment of the present invention is applied has the same configuration as the first embodiment. Therefore, only the portions different from those of the first embodiment are described below.

The switching of the characteristics can be realized by loading the addition/subtraction circuit 23 with the function of selecting whether or not the calculation of the output signal from the half-wave rectifier circuit 22 for the output signal from the second linear amplifier 21 is performed. Otherwise, it can be realized by changing the offset voltage to the second linear amplifier 21 because the signal output by the addition/subtraction circuit 23 matches the output signal of the first linear amplifier 20 until the input signal from the photodetector 15 to the second linear amplifier 21 exceeds the offset voltage and therefore the linear characteristic can be actually used if a voltage value of V1 or larger (when the input signal is the voltage value of V1, the voltage value of the output signal of the first linear amplifier 20 is V0 and saturated) is set as the offset voltage. In this example, it is assumed that the characteristics can be switched using the signal to the addition/subtraction circuit 23. With the assumption, the switching of characteristics can be realized by the microscope control circuit 18 changing a signal (hereinafter referred to as a "switch signal") to be output to the addition/subtraction circuit 23 of the amplifier 16 at an instruction from an operator through, for example, the input device not shown in the attached drawings.

Figure 13:
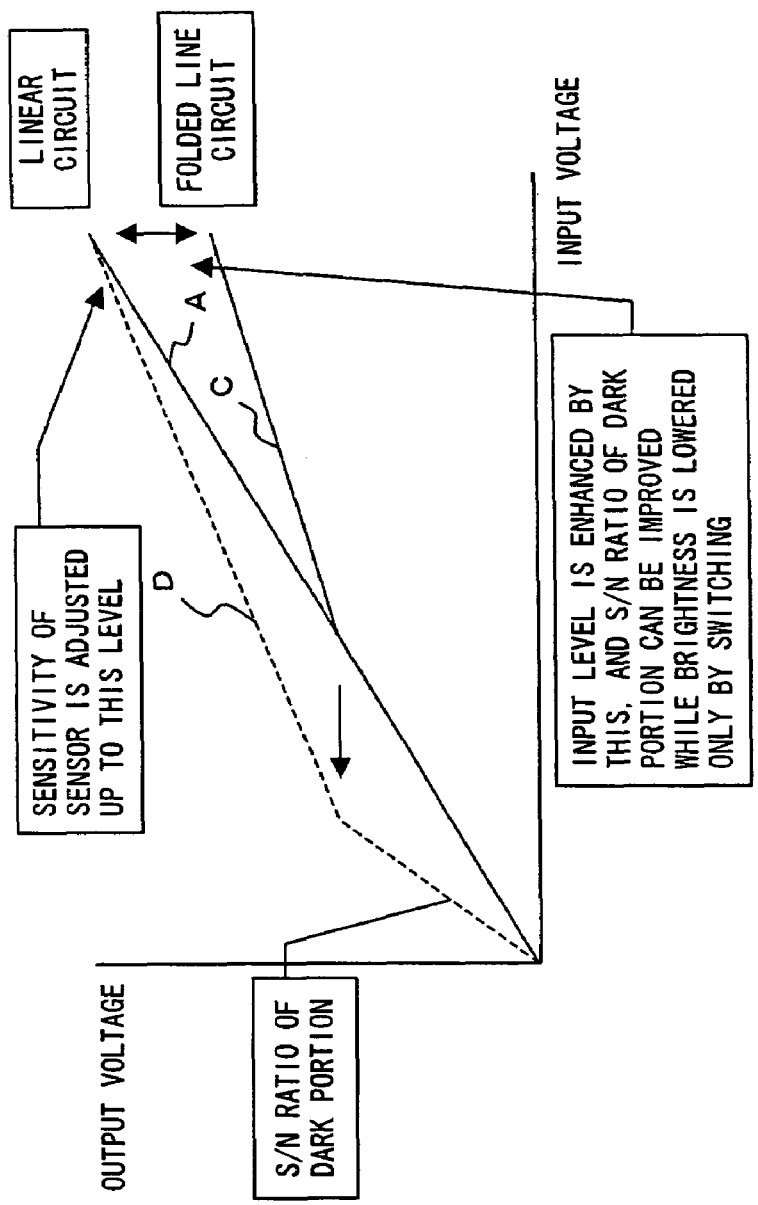
FIG. 13 is an explanatory view of a change in the level of the output signal at the switch of characteristics and the method for supporting the change (fourth embodiment)

Since the bright portion is compressed in the folded line characteristic, as shown in FIG. 13, when the observation condition for switching from the linear characteristic (A) to the folded line characteristic (C) is performed, the dynamic range of the output signal is narrowed by the switch, and the entire brightness seems to have been lowered. Thus, it is necessary for the operator (user) to make an adjustment to raise the brightness, and quick observation cannot be performed. On the other hand, when the observation condition is changed to switch from the folded line characteristic to the linear characteristic, the switching expands the dynamic range of the output signal, thereby easily generating saturation in which the bright portion exceeds the display limit. Therefore, the operator has to make an adjustment to reduce the brightness, thereby also disabling quick observation. As a result, according to the present embodiment, automatically corresponding to the switch of the characteristics, and appropriate output signal can be constantly output from the amplifier 16, thereby avoiding the reduction in efficiency of the operation by the brightness adjustment.

According to the present embodiment, a device having the function of amplifying an electric signal at an electronic level such as a photomultiplier tube (PMT), etc. is adopted as the photodetector 15. They are adopted as the photodetector 15 because they can amplify at a high S/N ratio which cannot be performed by an electric circuit. Other devices, for example, an APD, than the PMT can be used as the 15 if the above-mentioned amplification can be performed. The change of the amplification rate of the photodetector 15 is made at an instruction from the microscope control circuit 18.

When switching the characteristics is indicated by an operator through the input device not shown in the attached drawings, the microscope control circuit 18 changes a switch signal for input to the addition/subtraction circuit 23. Depending on the switching contents, the amplification rate of the photodetector 15 is changed correspondingly. If the switching from the linear characteristic to the folded line characteristic is performed, a higher amplification rate is set for the photodetector 15. If the switching from the folded line characteristic to the linear characteristic is performed, a lower amplification rate is set for the photodetector 15. Thus, the level of the input signal input from the photodetector 15 to the amplifier 16 is adjusted.

By the above-mentioned adjustment, if the switching from the linear characteristic to the folded line characteristic is performed, the output signal of the addition/subtraction circuit 23 can be changed from C indicated by the solid line to D indicated by the broken line by performing the amplification on a larger scale as shown in FIG. 13 to allow the photodetector 15 to amplify the input signal at a higher amplification rate. As a result, for example, if the output voltage range from 0 to V0 is obtained by the range of the detection signal 0 to V1 from the specimen 11 in the linear characteristic, then the output voltage range from 0 to V0 can be obtained by the range of the detection signal 0 to V1 although the switching to the folded line characteristic is performed. With the folded line characteristic, the S/N ratio in the dark portion can be improved. Thus, by constantly maintaining the output dynamic range, the impression of the entire brightness change by the switching of the characteristic is not given to a user. It indicates that when the brightness is adjusted to obtain an appropriate image before the switching, the appropriate image can also be obtained after the switching. Therefore, the operator can continue the observation on an appropriate image after the switching of characteristics. Since the brightness adjustment can be optimally and automatically performed, the necessity to make the adjustments can be avoided, and the operability and the convenience can be improved. This holds true with the switching from the folded line characteristic to the linear characteristic.

Described below is the change of the amplification rate set in the photodetector 15 with the switching of the characteristics. The amplification rate is hereinafter referred to as "multiplication factor".

Figure 14:
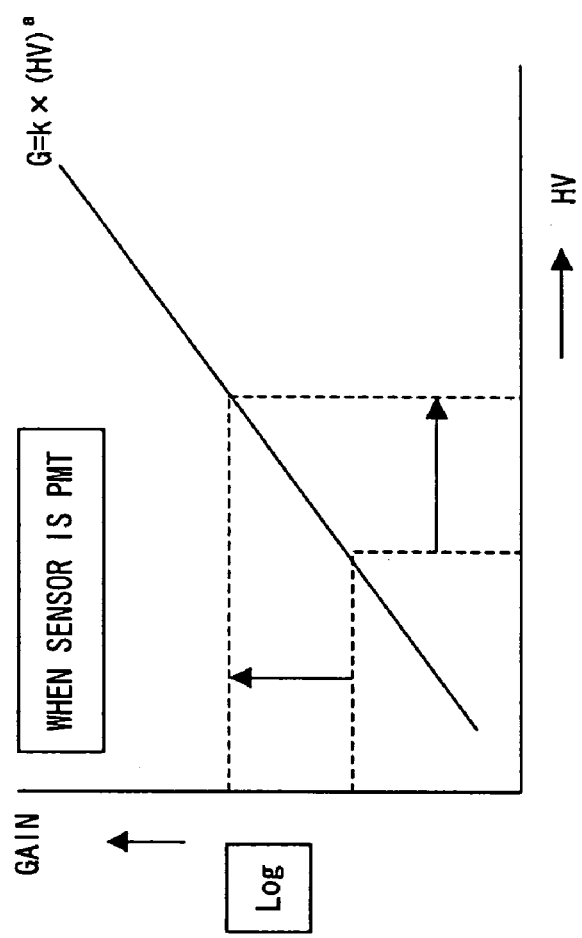
FIG. 14 is an explanatory view of the gain characteristic of the PMT applied as a photodetector 15.

FIG. 14 is an explanatory view of the gain characteristic of the PMT adopted as the photodetector 15, and shows the relationship the gain (mf: multiplication factor) and the applied high-voltage (HV) to the PMT.

The gain characteristic of the PMT is represented by the following equation $$G = k \times (HV)^a \quad (1)$$

where G indicates the gain (mf) of the PMT, k and a indicate the constants specific to the PMT.

The values "k" and "a" in the equation (1) are specific to the PMT, and there is the respective variances. Therefore, to set an appropriate multiplication factor for the PMT, the actual value of the constants k and a are to be correctly specified. The values of the constants k and a are specified as follows.

First, for example, a relatively uniform object such as a mirror face, etc. is observed as the specimen 11, and a combination the brightness (output signal) I at a plurality of points and an HV value (mf) as using the first linear amplifier 20. For example, assume that the combinations of the brightness I and the HV value of ($I_{30}$, $HV_{30}$), ($I_{60}$, $HV_{60}$), and ($I_{90}$, $HV_{90}$) are obtained at 30%, 60%, and 90% of the output dynamic ranges are obtained at three points. The HV values and the multiplication factors obtained at these points are substituted for the equation (1), and the values of the constants k and a are obtained. Thus, regardless of the reflectance of the specimen 11, the characteristic is to be switched with the output dynamic range adjusted.

The values of the constants k and a specified above are, for example, prepared as control data to be stored in the computer 2 for each body of a microscope 1. The program to be installed to the computer 2 realizes the microscope control circuit 18 which changes the multiplication factor of the PMT depending on the characteristic switching.

Figure 15:
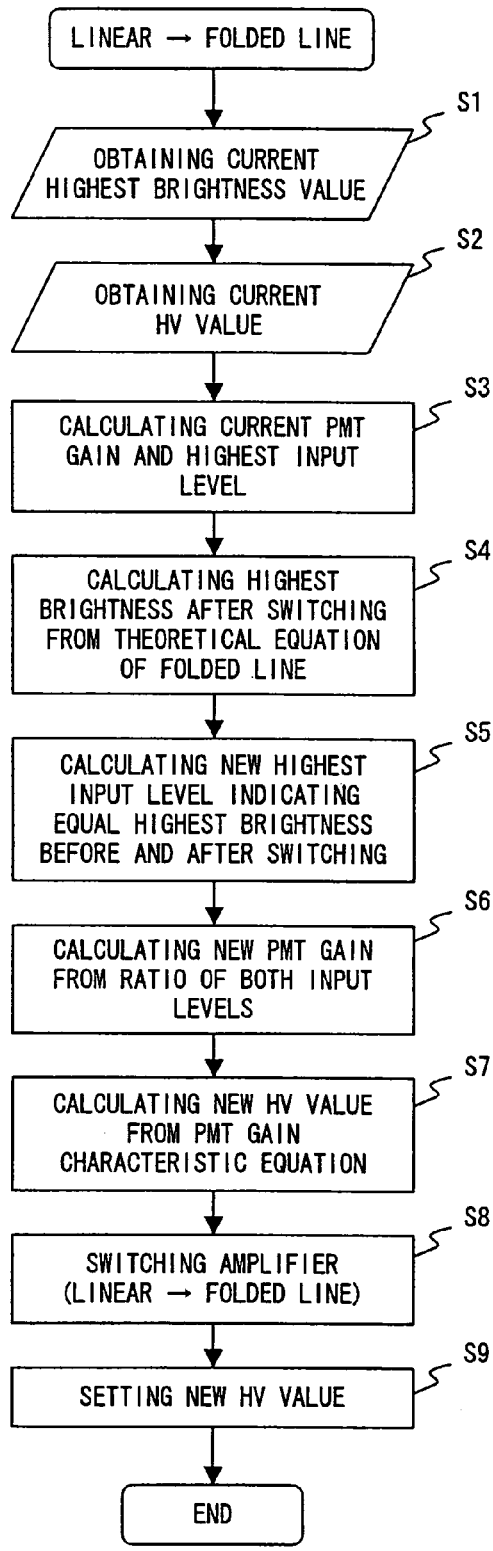
FIG. 15 is a flowchart of the characteristic switching process from linear to folded line by the microscope control circuit 18 (fourth embodiment)

FIG. 15 is a flowchart of the characteristic switching process from the linear characteristic to the folded line characteristic performed by the microscope control circuit 18. Then, the characteristic switching process is described below in more detail by referring to FIG. 15. The switching process is performed when an operator indicates the switching of the characteristics from the linear characteristic to the folded line characteristic through the input device not shown in the attached drawings.

First, in step S1, the highest level (indicated by "highest brightness value" in FIG. 15) of the output signal output from the amplifier 16 is obtained. Then, in step S2, the applied high-voltage (HV) value currently set in the photodetector (PMT) 15 is obtained. In the next step S3, the current multiplication factor (gain) is calculated by the equation (1) from the HV value obtained in step S2, and the highest level of the input signal with which the highest level of the output signal obtained in step S1 is calculated.

In step S4 after step S3, from the theoretical equation of a folded line characteristic, the highest level of an output signal is calculated by using the characteristic and the input signal which obtained the highest level calculated in S3. After the calculation, control is passed to step 5, and the highest level of the input signal required to obtain the highest level of the output signal calculated in step S1 in the folded line characteristic is calculated. Then, control is passed to step S6.

As shown in FIG. 5, if the output signal of the first linear amplifier 20 is V0 and saturated when the input signal is V1, V1 is calculated as the highest level of the input signal in step S3. The folded line characteristic has the inclination of (G1-G2) passing through and from the point of the offset voltage. If the V0 is obtained in step S1 as the highest level of the output signal, the level (V2 shown in FIG. 5) of the input signal when the output signal is V0 from the folded line characteristic can be specified. The highest level of the input signal calculated in step S5 is, for example, the level. The highest level of the output signal calculated in step S4 is, for example, obtained when the input signal is V1. In this example, the level of the output signal at this time is noted as Vf.

In step S6, the multiplication factor (gain) to be newly set in the photodetector (PMT) 15 from the ratio of the highest level of the input signal calculated in steps S3 and S5 is calculated. In the next step S7, the HV value to obtain the multiplication factor is calculated. Hereafter, the switch signal to the addition/subtraction circuit 23 of the amplifier 16 is changed and the linear characteristic is switched to the folded line characteristic (step S8), the HV value is set in the photodetector (PMT) 15 (step S9), and then the series of processes terminate.

When the linear characteristic in which the output signal is V0 when the input signal is V1 is simply switched to the folded line characteristic, the output signal is Vf with the input signal, thereby reducing the entire brightness. To avoid this, it is necessary to raise the output signal from Vf to V0.

This can be realized by setting the input signal which is V1 in the linear characteristic to V2 in the folded line characteristic.

The multiplication factor obtained in step S3 is set in the photodetector 15 in the linear characteristic. Assuming that the multiplication factor is $G_{V_1}$ and the multiplication factor to be set in the folded line characteristic is $G_{V_2}$, the collation can be represented by $G_{V_2}=G_{V_1}\times V2/V1$, thereby obtaining the input signal which is V1 in the linear characteristic as V2 in the folded line characteristic. The multiplication factor obtained in step S6 is thus obtained $G_{V_2}$, and the HV value obtained in step S7 is the HV value calculated by substituting the $G_{V_2}$ for the equation (1).

Although the linear characteristic is switched to the folded line characteristic by newly setting the obtained HV value in the photodetector (PMT) 15, the output dynamic range for the input signal is equally maintained (D shown in FIG. 13). Therefore, when characteristics are switched, the undesired impression that the entire brightness is changed can be avoided without fail.

Figure 16:
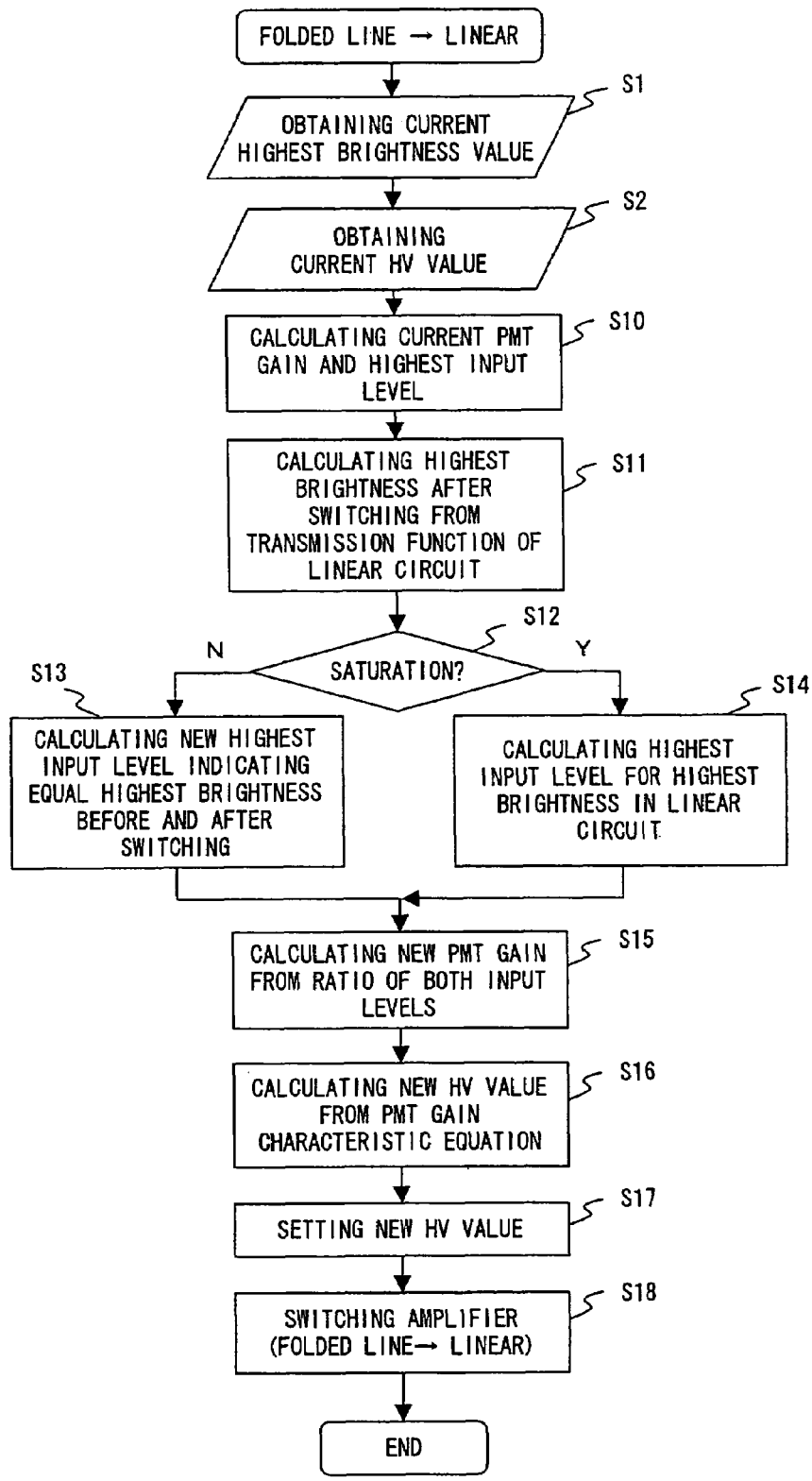
FIG. 16 is a flowchart of the characteristic switching process from folded line to linear by the microscope control circuit 18 (fourth embodiment)

FIG. 16 is a flowchart of the characteristic switching process from a folded line to a linear line performed by the microscope control circuit 18. Then, by referring to FIG. 16, the characteristic switching process is described in detail. The switching process is performed when an operator indicates the switching of the characteristics from the linear characteristic to the folded line characteristic through the input device not shown in the attached drawings. The process step having the same contents as the switching process shown in FIG. 15 is assigned the same reference symbols, and the explanation is omitted here.

In the characteristic switching process shown in FIG. 16, when the current applied high-voltage (HV) value is obtained in step S2, then control is passed to step S10, and the current multiplication factor (gain: $G_{V_2}$) is calculated from the HV value, and the highest level of the input signal from which the highest level of the output signal obtained in step S1 is obtained is calculated. Control is then passed to step S11.

In step S11, the highest level of the output signal obtained by the input signal whose highest level is calculated in step S10 from the transmission function of the linear characteristic (first linear amplifier 20) is calculated. After the calculation, control is passed to step S12, and it is determined whether or not the calculated highest level is saturated. When the highest level does not exceed V0, the determination is NO, and the highest level of the input signal required to obtain the highest level of the output signal calculated in step S1 from the linear characteristic is calculated in step S13, and control is passed to step S15. Otherwise, that is, when the calculated highest level exceeds V0, the determination is YES, and the highest level of the input signal while the highest level of the output signal is obtained by the linear characteristic is calculated in step S14, and then control is passed to step S15.

In step S15, from the ratio between the highest level of the input signal calculated in step S10, and the highest level of the input signal calculated in steps S13 or S14, the multiplication factor (gain) to be newly set in the photodetector (PMT) 15 is calculated. In the next step S16, the HV value for acquisition of the multiplication factor is calculated. Afterwards, the HV value is set in the photodetector (PMT) 15 (step S17), and the switch signal to the addition/subtraction circuit 23 of the amplifier 16 is changed to switch from the folded line characteristic to the linear characteristic (step S18), thereby terminating the series of processes.

When the folded line characteristic in which the output signal is V0 when the input signal is V2 is simply switched to the liner characteristic, the output signal with the input signal is quickly saturated. Therefore, to avoid this, the input signal which is V2 in the folded line characteristic is set to V1 in the linear characteristic.

The $G_{V_2}$ obtained in step S10 is set in the photodetector 15 in the folded line characteristic. The $G_{V_1}$ to be newly set in the linear characteristic is expressed by $G_{V_1}=G_{V_2}\times V1/V2$ using $G_{V_2}$. The multiplication factor obtained in step S15 is thus obtained $G_{V_1}$, and the HV value obtained in step S16 is the HV value calculated by substituting the $G_{V_1}$ for the equation (1).

Although the folded line characteristic is switched to the linear characteristic by newly setting the obtained HV value in the photodetector (PMT) 15, the output dynamic range for the input signal is equally maintained. Therefore, when characteristics are switched, the undesired impression that the entire brightness is changed can be avoided without fail.

The fifth embodiment of the present invention is described below.

In the above-mentioned fourth embodiment, the observation condition is automatically changed in response to the switching of characteristics. On the other hand, in the fifth embodiment, the change of the observation condition in response to the switch of an object lens is furthermore automatically performed.

The configuration of the confocal microscope to which the fifth embodiment of present invention is applied is the same as that according to the fourth embodiment. The operations are almost the same, or basically the same. Therefore, the different portions from the fourth embodiment are described below using the reference symbols used in the fourth embodiment.

Figure 17:
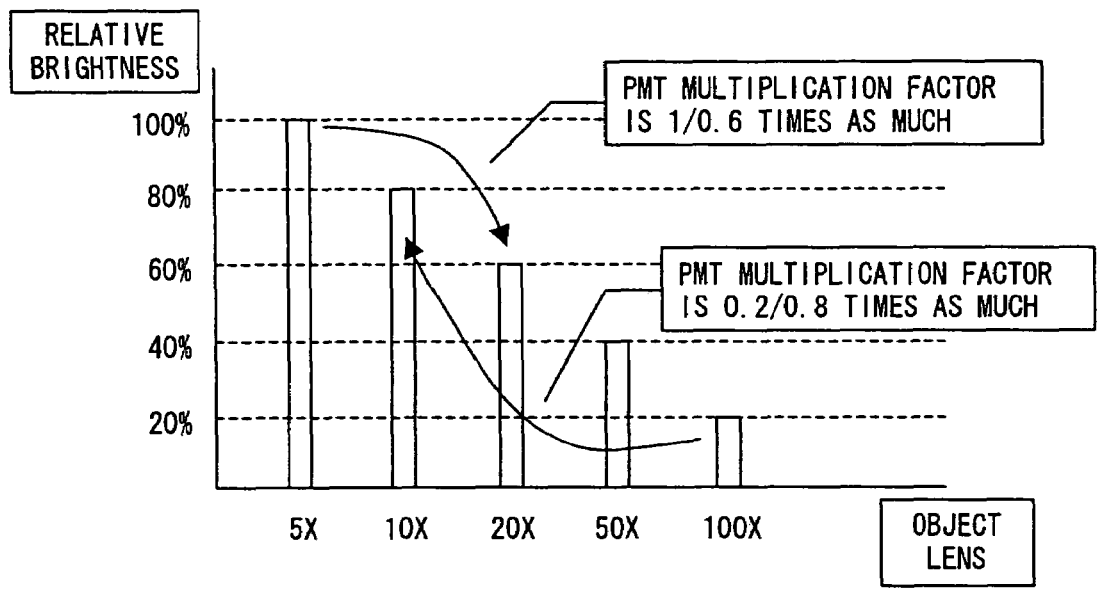
FIG. 17 shows the relationship relative brightness between the object lenses 10 having different powers.

The quantity of the light incident to the object lens 10 depends on the power of the lens. The quantity of the light, that is, the brightness of an image, increases as the power becomes lower as shown in FIG. 17. Therefore, when the object lens 10 is switched, the brightness of the image is entirely changed. In the fifth embodiment, the multiplication factor of the photodetector (PMT) 15 is adjusted, and the change is automatically supported, thereby continuously obtaining an appropriate image after the switch of the object lens 10.

The relationship in brightness between the object lenses 10 having different power as shown in FIG. 17 is expressed by the brightness of the object lenses 10 of 10×, 20×, 50×, and 100× based on the brightness (100) of the object lens 10 of 5×. The relationship can be prepared as the control data, but can also be individually set. The individual settings are performed as follows.

First, a sample such as a mirror face is observed as the specimen 11 by a 5× object lens 10, and the brightness is adjusted to the full dynamic range (100%). Then, for example, the lens is replaced with a 10× object lens 10, and the maximum brightness level is obtained without adjusting the image brightness in the focusing state. The maximum brightness level of different power of the object lens 10 is obtained similarly. Thus, the data correctly indicating the relationship between the object lenses 10 having different power as shown in FIG. 17 is obtained.

Figure 18:
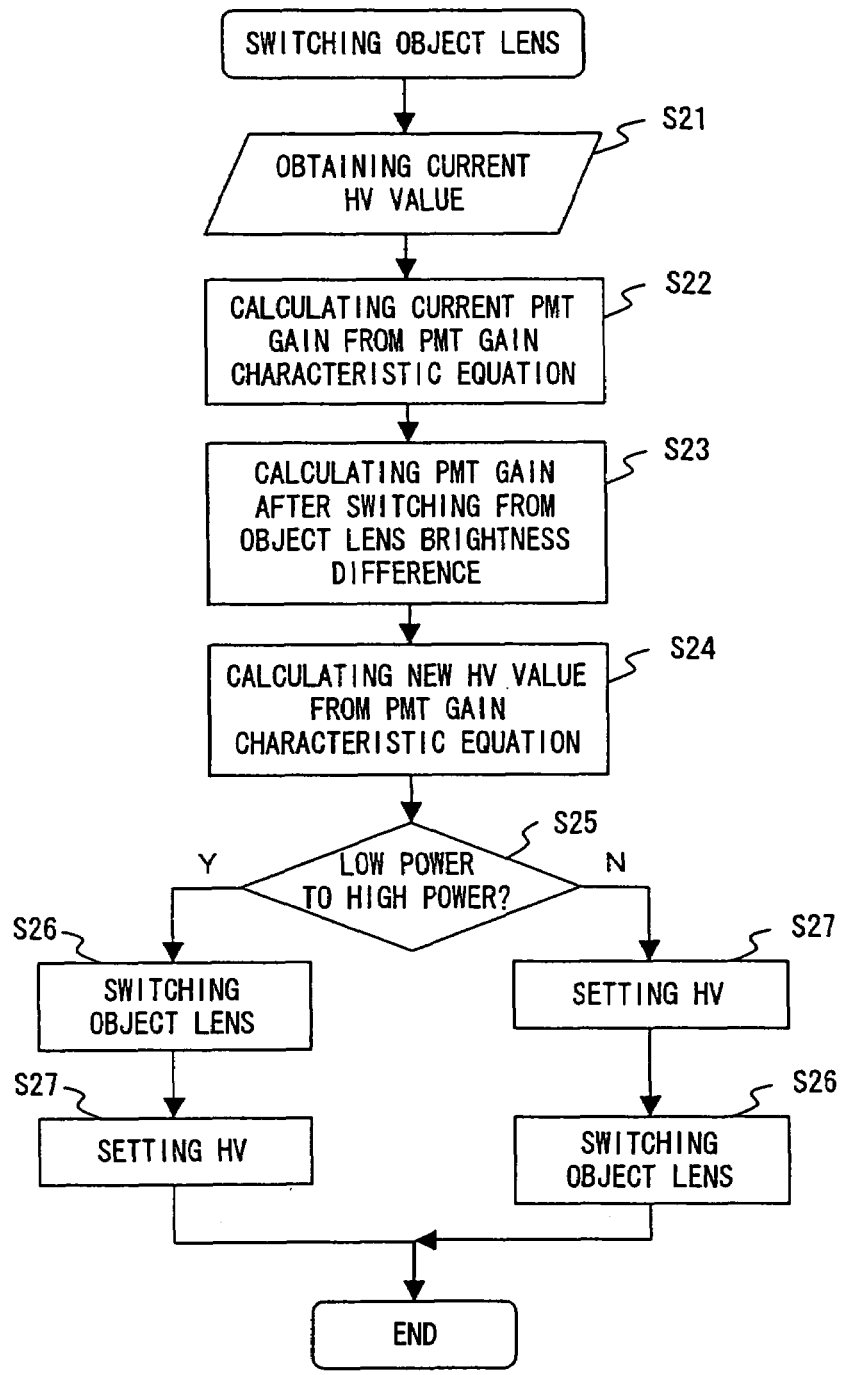
FIG. 18 is a flowchart of the object lens switching process performed by the microscope control circuit 18 (fifth embodiment).

FIG. 18 is a flowchart of the object lens switching process performed by the microscope control circuit 18. The switching process is described below in detail by referring to FIG. 18. The switching process is performed when an operator specifies the switching of the object lens 10 using the input device not shown in the attached drawings.

The switching of the object lens 10 is performed by specifying desired power as described above. When the operator specifies the switching of the object lens 10 with the desired power designated, the microscope control circuit 18 instruct the Z axis travel control circuit 17 to switch the object lens 10 having the power. Thus, the object lens 10 having the specified power is moved to the optical observation path in the object lenses 10 mounted on the revolver 9, thereby performing the switching.

First, in step S21, the high applied voltage (HV) value currently set in the photodetector (PMT) 15 is obtained. In the next step S22, the current multiplication factor (gain) is calculated using the HV value by the equation (1). In the next step S23, based on the brightness relationship between the switched and switching object lenses 10, the multiplication factor to be newly set in the photodetector (PMT) 15 after the switching is calculated. Afterwards, control is passed to step S24.

In step S24, the calculated multiplication factor is substituted in the equation (1), and the HV value for acquisition of the multiplication factor is calculated. Then, in step S25, a determination is made to change the procedure for avoiding the saturation depending on the power change direction. Thus, the Z axis travel control circuit 17 is instructed to switch the object lens 10 in step S26 if the lens is switched from low power to high power, the calculated HV value is newly set in the photodetector (PMT) 15 (step S27), thereby terminating a series of processes. If the lens is switched from high power to low power, the calculated HV value is newly set in the photodetector (PMT) 15 (step S27), and the Z axis travel control circuit 17 is instructed to switch the object lens 10 in the next step S26, thereby terminating the series of processes.

As shown in FIG. 17, for example, when a 5× object lens 10 is switched to a 20× object lens 10, the brightness level is reduced to 60%. Therefore, to maintain the apparent brightness, the multiplication factor $G_{20}$ of a 20× object lens 10 is obtained by multiplying the multiplication factor $G_5$ of a 5× object lens 10 by 1/0.6. Therefore, it is obtained by $$G_{20}=G_5\times(1/0.6)=k\times(G_{20})^a$$

Thus, the HV value ($HV_{20}$) to be set by switching the object lens 10 can be obtained. In this example, $G_5$ is calculated in step S22, $G_{20}$ is calculated in step S23, and $HV_{20}$ is calculated in step S24.

On the other hand, if a 100× object lens 10 is switched to a 10× object lens 10, the brightness level is 0.8/0.2 times as high as shown in FIG. 17. To avoid the saturation, the multiplication factor $G_{10}$ of the 10× object lens 10 is obtained by multiplying the $G_{100}$ of the 100× object lens 10 by 0.2/0.8. Therefore, the HV value ($HV_{10}$) to be set by the switching of the object lens 10 is obtained by $$G_{10}=G_{100}\times(0.2/0.8)=k\times(HV_{10})^a$$

Thus, automatically in response to the switch between the arbitrary object lenses 10, the multiplication factor to be newly set in the photodetector (PMT) 15 after the switching with the relative brightness difference between them taken in account, the HV value at which the multiplication factor is obtained is set in the photodetector (PMT) 15. Therefore, in response to the switching between the object lenses 10, the optimum brightness adjustment is automatically made, and the apparent difference when the switching is performed can be suppressed. Thus, the apparent brightness of an image can be maintained at a substantially constant level although the object lens 10 is switched. As a result, since an operator can continue observation in the optimum state after switching the object lens 10, the operability and convenience can be outstandingly improved. When a focusing amendment is also made between the object lenses 10, the necessity to make a readjustment of the focal position in addition to the brightness adjustment in response to the switching of the object lenses 10 can also be removed. Therefore, the operability and convenience can be further improved.

The fourth and fifth embodiments of the present invention are determined above, but the photodetection circuit and the confocal microscope provided with the photodetection circuit are not limited to the above-mentioned embodiments so far as the functions are realized and the configuration or the operations are adopted within the gist of the present invention.

What is claimed is:

1. A confocal microscope comprising:
a light source generating a light to irradiate to a specimen;
a photodetection unit amplifying and detecting an optical signal reflected from the specimen through a pinhole;
a first amplification unit amplifying an output signal from the photodetection unit at a predetermined amplification rate;
an offset unit giving an offset to an output signal from the photodetection unit;
a second amplification unit amplifying an output signal from the photodetection unit to which an offset is given at an amplification rate that is smaller than the predetermined amplification rate of the first amplification unit;
a rectification unit for passing and rectifying only one side signal of positive and negative signals of the output signal from the second amplification unit;
an addition/subtraction unit calculating the output signal from the first amplification unit and the output signal from the rectification unit;
an image input circuit receiving an output signal from the addition/subtraction unit and forming an image from the received output signal; and
a display unit displaying the image formed in the image input circuit.

2. The confocal microscope according to claim 1, wherein
the offset unit comprises a plurality of offset units which assign offset such that increment can be assigned to the output signal from the photodetection unit;
the second amplification unit comprises a plurality of amplifiers having an amplification rate capable of assigning decrement to each output signal from the plurality of offset units; and
the rectification unit comprises a plurality of rectification units corresponding to the respective amplifiers.

3. The confocal microscope according to claim 1, wherein
an offset value assigned by the offset unit and an amplification rate of the second amplification unit can be arbitrarily variable.

4. The confocal microscope according to claim 1, further comprising
a signal removal unit capable of removing from an output signal output by the addition/subtraction unit an output signal component from the rectification unit.

5. The confocal microscope according to claim 4, wherein
when the output signal output by the first amplification unit exceeds a predetermined level, the signal removal unit removes an increment generated in the output signal output by the rectification unit from the output signal output by the addition/subtraction unit after the predetermined level is exceeded.

6. The confocal microscope according to claim 1, wherein the addition/subtraction unit performs addition or subtraction using the output signal from the first amplification unit and the output signal from the rectification unit.

7. The confocal microscope according to claim 1, wherein the photodetection unit is sensitivity-variable optical sensor.

8. The confocal microscope according to claim 1, wherein the addition/subtraction unit comprises a switch unit for enabling or disabling calculation using the output signal from the first amplification unit and the output signal from the rectification unit.

* * * * *